(12) United States Patent
Brandt

(10) Patent No.: US 11,731,062 B2
(45) Date of Patent: Aug. 22, 2023

(54) COMPONENTS THAT FACILITATE MAINTENANCE OF CHROMATOGRAPHY AND SYNTHESIS COLUMNS

(71) Applicant: Asahi Kasei Bioprocess America, Inc., Glenview, IL (US)

(72) Inventor: Michael D. Brandt, Cassopolis, MI (US)

(73) Assignee: Asahi Kasei Bioprocess America, Inc., Glenview, IL (US)

(*) Notice: Subject to any disclaimer, the term of this patent is extended or adjusted under 35 U.S.C. 154(b) by 250 days.

(21) Appl. No.: 17/153,475

(22) Filed: Jan. 20, 2021

(65) Prior Publication Data
US 2022/0226751 A1 Jul. 21, 2022

(51) Int. Cl.
*B01D 15/22* (2006.01)
*G01N 30/60* (2006.01)
*B01D 15/20* (2006.01)

(52) U.S. Cl.
CPC .......... *B01D 15/22* (2013.01); *B01D 15/206* (2013.01); *G01N 30/6004* (2013.01); *G01N 30/6065* (2013.01)

(58) Field of Classification Search
CPC .. B01D 15/22; B01D 15/206; G01N 30/6004; G01N 30/6065
See application file for complete search history.

(56) References Cited

U.S. PATENT DOCUMENTS

| 5,141,635 A | * | 8/1992 | LePlang | B01D 15/08 210/656 |
|---|---|---|---|---|
| 5,169,522 A | | 12/1992 | Shalon et al. | |
| 5,470,479 A | * | 11/1995 | Snyder | B01D 59/30 210/659 |
| 5,528,923 A | | 6/1996 | Ledez et al. | |
| 5,902,485 A | | 5/1999 | Davis et al. | |
| 5,919,361 A | | 7/1999 | Moran | |
| 6,090,279 A | | 7/2000 | Davis et al. | |
| 6,123,849 A | | 9/2000 | Purdom | |
| 6,171,486 B1 | | 1/2001 | Green et al. | |
| 6,190,560 B1 | | 2/2001 | Mann | |
| 6,277,283 B1 | | 8/2001 | Davis et al. | |
| 6,294,090 B1 | | 9/2001 | Nussbaumer et al. | |

(Continued)

FOREIGN PATENT DOCUMENTS

| EP | 0464356 B1 | 4/1993 |
|---|---|---|
| EP | 1143243 A1 | 10/2001 |
| WO | WO-1998022212 A1 | 5/1998 |

OTHER PUBLICATIONS

International Search Report and Written Opinion, International Application No. PCT/US2022/012844, dated Apr. 20, 2022.

(Continued)

*Primary Examiner* — Benjamin L Lebron
(74) *Attorney, Agent, or Firm* — Marshall, Gerstein & Borun LLP

(57) ABSTRACT

A chromatography and synthesis column that includes a main tube, a plurality of lower media ports, and an internal groove. The internal groove is formed in an interior surface of the main tube and selectively provides an internal flow path between each of the internal lower media ports. This, in turn, facilitates quick and easy maintenance of the internal lower media ports and other components of the chromatography and synthesis column.

22 Claims, 18 Drawing Sheets

(56) References Cited

U.S. PATENT DOCUMENTS

| | | |
|---|---|---|
| 6,524,484 B2 | 2/2003 | Davis et al. |
| 6,676,168 B2 | 1/2004 | McAliley |
| 6,719,899 B2 | 4/2004 | Davis et al. |
| 6,749,749 B2 | 6/2004 | Xie et al. |
| 6,811,688 B1 | 11/2004 | Hofmann |
| 6,916,114 B2 | 7/2005 | Verkerk |
| 6,973,784 B2 | 12/2005 | Okuma |
| 6,979,402 B1 * | 12/2005 | Sprague ............ B01D 15/1892 210/659 |
| 7,258,060 B2 | 8/2007 | Dahl |
| 7,419,599 B2 | 9/2008 | Andersson et al. |
| 7,452,471 B2 | 11/2008 | Windahl |
| 7,674,383 B2 | 3/2010 | Rahn et al. |
| 7,718,058 B2 | 5/2010 | Agee et al. |
| 7,781,159 B2 | 8/2010 | Gazenko |
| 7,820,042 B2 | 10/2010 | Agren |
| 8,287,737 B2 | 10/2012 | Bielawski et al. |
| 8,474,336 B2 | 7/2013 | Hubbuch et al. |
| 2006/0049090 A1 | 3/2006 | Spoldi et al. |
| 2006/0213824 A1 | 9/2006 | Higgins et al. |
| 2007/0056910 A1 | 3/2007 | Ramaprasad et al. |
| 2007/0193933 A1 | 8/2007 | Vidalinc |
| 2008/0264837 A1 | 10/2008 | Agee et al. |
| 2008/0308498 A1 * | 12/2008 | Davis ..................... B01D 15/10 210/656 |
| 2009/0001008 A1 | 1/2009 | Deorkar et al. |
| 2011/0259831 A1 | 10/2011 | Brandt et al. |
| 2013/0213486 A1 | 8/2013 | Brandt |
| 2019/0314741 A1 | 10/2019 | Brandt |

OTHER PUBLICATIONS

Suisse, Brian. Research for Dynamic Seal Friction Modeling in Linear Motion Hydraulic Piston Applications. The University of Texas at Arlington, Aug. 2005. p. 1-73.
Bioprocess cols. Technikrom, 2006, pp. 1-4.
User Manual for LPLC Columns, 60 cm series, version 1.6. Technikrom, Aug. 2003, pp. 1-33.

* cited by examiner

COMPONENTS THAT FACILITATE MAINTENANCE OF CHROMATOGRAPHY AND SYNTHESIS COLUMNS

FIELD OF THE DISCLOSURE

The present disclosure generally relates to chromatography and synthesis columns and, more particularly, to components (e.g., internal grooves, media ports) that facilitate maintenance of chromatography and synthesis columns.

BACKGROUND

Preparative liquid chromatography is widely used in different forms for purifying chemical and biological substances. A typical liquid chromatography apparatus has an upright housing in which a bed of porous media rests against a permeable bed support. A liquid mobile phase enters a distributor plate which distributes the liquid mobile phase through the bed and is removed via an outlet. Separation of substances takes place between the mobile phase carrying the product through the column and the stationary phase of the porous media. Typically, the porous media is compressed in the column as a packed bed, generally formed by consolidating a suspension of discrete particles, known as slurry, that is pumped or poured into the column and consolidated by compression with a movable piston.

Routine maintenance of the chromatography column may include packing and unpacking the bed using ports in the main tube called slurry ports. Slurry ports may be in the main tube near the top, the bottom, or both. Slurry ports near the top of the main tube are typically used to fill the interior of the column with the slurry. Slurry can be poured or pumped into the upper slurry port to fill the column. The line used to dispense the slurry may be rinsed into the upper slurry port to chase every drop of media into the interior of the column. The upper slurry port can be closed, and the slurry consolidated into a bed by moving a piston within the column to squeeze the liquid out of the slurry. The bed thus formed may be solid or a semi-solid depending on the media of the slurry and the pressure of the piston. Slurry ports near the bottom of the main tube are typically used to unpack a semi-solid bed. A semi-solid bed can be unpacked by releasing pressure on the piston, flowing to disrupt the bed, opening the lower slurry port(s) and flushing out the bed or recirculating the media. Slurry ports provide access to the inside of the column and it is advantageous to clean them out after use.

However, known slurry ports present several different problems. First, traditional slurry ports are spaced apart from one another along the circumference of the main tube, which is inefficient for flushing out the bed because eddies form inside the column, thereby impeding uniform cleanout of the column. Second, slurry ports in general tend to create blemishes in the cylindricity of the internal wall of the column, which in turn has a negative influence on chromatography.

SUMMARY

In accordance with a first aspect, a chromatography column includes: a main tube with an internal radial groove; a top plate removably connected to a first end of the main tube; a bottom plate removably connected to a second end of the main tube, which bottom plate is movable within the main tube and has slurry ports on the underside; a piston assembly movable within the main tube; a piston rod connected to the piston assembly, which piston rod is arranged to extend through an opening in the top plate; and a frame supporting the column on the floor, which frame is connected to the main tube and capable of lifting the main tube relative to the immobile bottom plate. Actuating means are arranged on the three legs of the frame so that an internal radial groove in the main tube can be moved to a first position relative to the bottom plate to expose the inside of the main tube to slurry ports arranged in the bottom plate. In a second position relative to the bottom plate, the internal radial groove in the main tube is exposed to the slurry ports so they may be cleaned while the second position also provides for operating and packing the chromatography column. In a third position relative to the bottom plate, the main tube is completely removed from the bottom plate.

In accordance with a second aspect, a chromatography column includes: a main tube with an internal radial groove; a top plate removably connected to a first end of the main tube; a bottom plate removably connected to a second end of the main tube, which bottom plate is movable within the main tube and has slurry ports on the underside; a piston assembly movable within the main tube; and a piston rod connected to the piston assembly, which piston rod is arranged to extend through an opening in the top plate.

In accordance with a third aspect, a chromatography column includes a main tube; a bottom plate coupled to the main tube; a plurality of lower media ports carried by the bottom plate; and an internal groove formed in an interior surface of the main tube, wherein the internal groove interacts with the bottom plate and selectively provides an internal flow path between each of the lower media ports.

In accordance with a fourth aspect, a chromatography column includes: a main tube comprising an interior chamber that is adapted to contain a bed of media; a bottom plate coupled to the main tube; a plurality of lower media ports carried by the bottom plate; and an internal groove formed in an interior surface of the main tube, wherein the interior chamber is selectively accessible via the internal groove, and wherein the internal groove provides an internal flow path between each of the lower media ports.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The present disclosure is generally directed to chromatography and synthesis columns, assemblies, components, and methods of assembly and disassembly. The chromatography and synthesis columns as provided herein can be easily assembled and disassembled for maintenance saving time and potential damage to the columns. The chromatography and synthesis columns can further be provided with a stable base for securely moving the columns. The chromatography and synthesis columns can alternatively or additionally be provided with components (e.g., internal grooves, media ports) that facilitate efficient maintenance of the columns.

Figure 1:
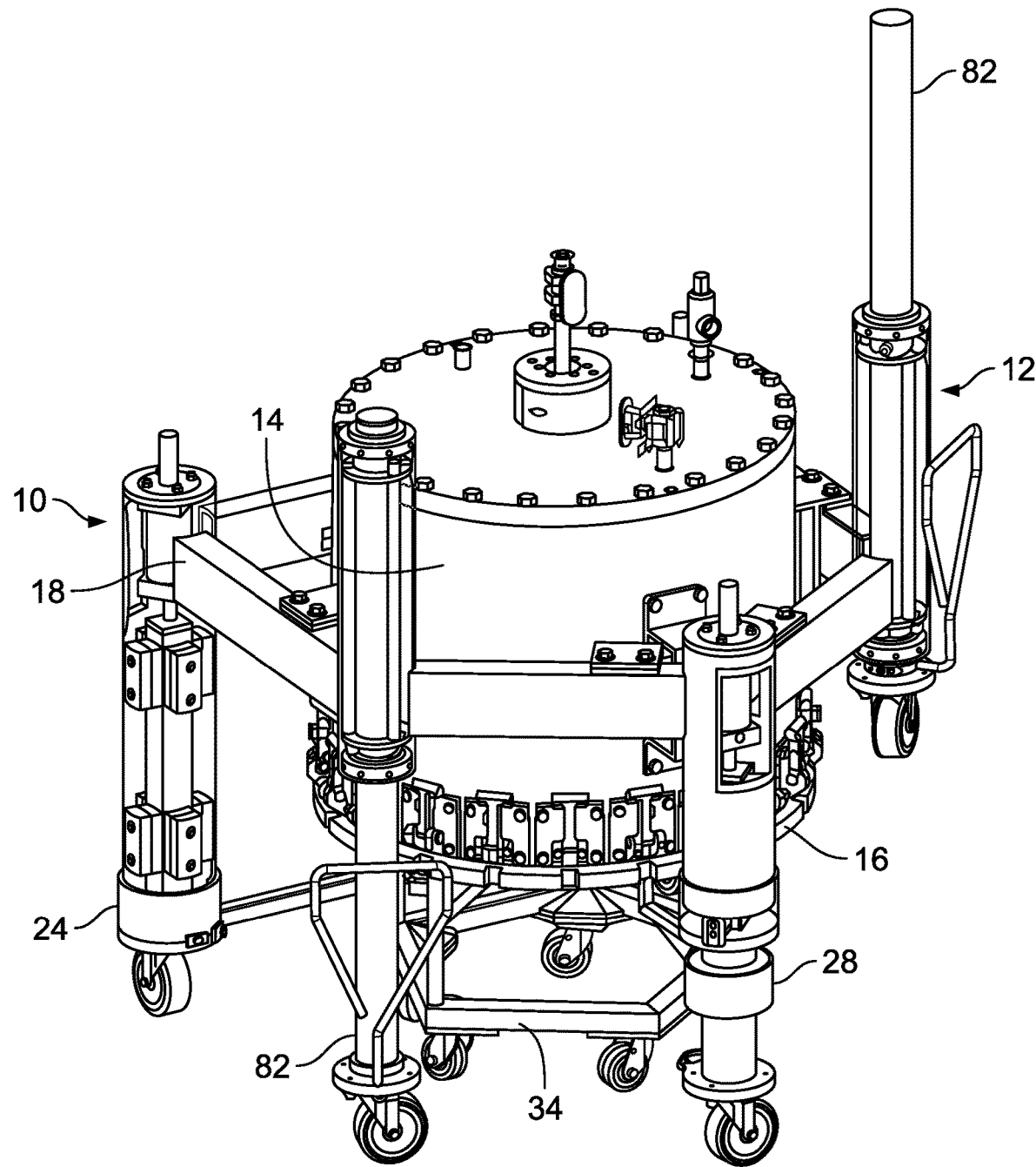
FIG. 1 is a perspective view of a chromatography and synthesis column and base assembly in accordance with various embodiments.
Figure 2:
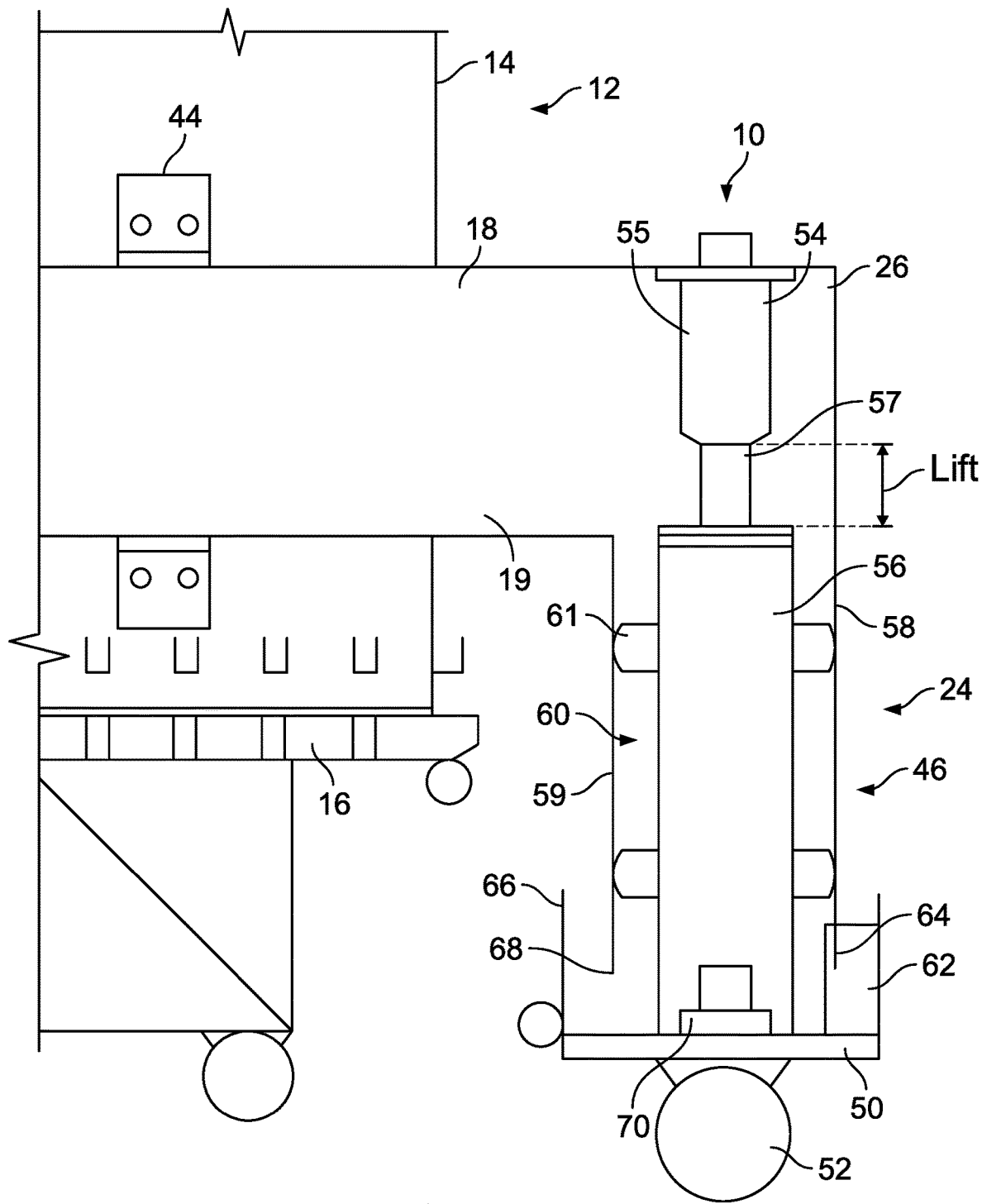
FIG. 2 is a side cross-sectional view of a leg assembly for a base assembly showing a hydraulic cylinder in accordance with various embodiments.

An exemplary support assembly 10 for a chromatography and synthesis column 12 that includes a generally annular main tube 14 and a bottom plate 16 is described with reference to FIGS. 1-12. As shown in FIG. 2, in one form, the support assembly 10 includes a rigid frame 18 that has a house-shaped pentagon configuration with cross-members 19 extending around a rear rectangular portion 20 and a forward triangular portion 22. In the illustrated form, the frame 18 is sized to extend around the column 12 such that the column 12 is disposed both within the rectangular and triangular portions 20, 22.

The support assembly 10 further includes two rear legs 24 that are mounted to the frame 18 at rear corners 26 of the rectangular portion 20 and a front leg 28 mounted to the frame 18 at a forward corner 30 of the triangular portion 22. As shown, the frame 18 is configured so that the forward corner 30 and front leg 28 align with a midpoint of the frame cross-member 19 extending between the rear corners 26. Further, in one form, the front leg 28 is set a distance from the column 12 generally equal to the closest perpendicular spacing of the column 12 to the three cross-members 19 of the frame 18 in the rectangular portion 20.

In some embodiments, the support assembly 10 can be configured to lift the column 12 to thereby ease removal of the bottom plate 16 and other maintenance actions. To accomplish this, as shown in FIGS. 1-6, the frame 18 is secured to the main tube 14 using brackets 44 or other suitable methods, such as welding, and lower leg assemblies 46, 48 for the rear legs 24 and front leg 28, respectively, cooperate to lift the frame 18 and the column 12 secured thereto.

Figure 3:
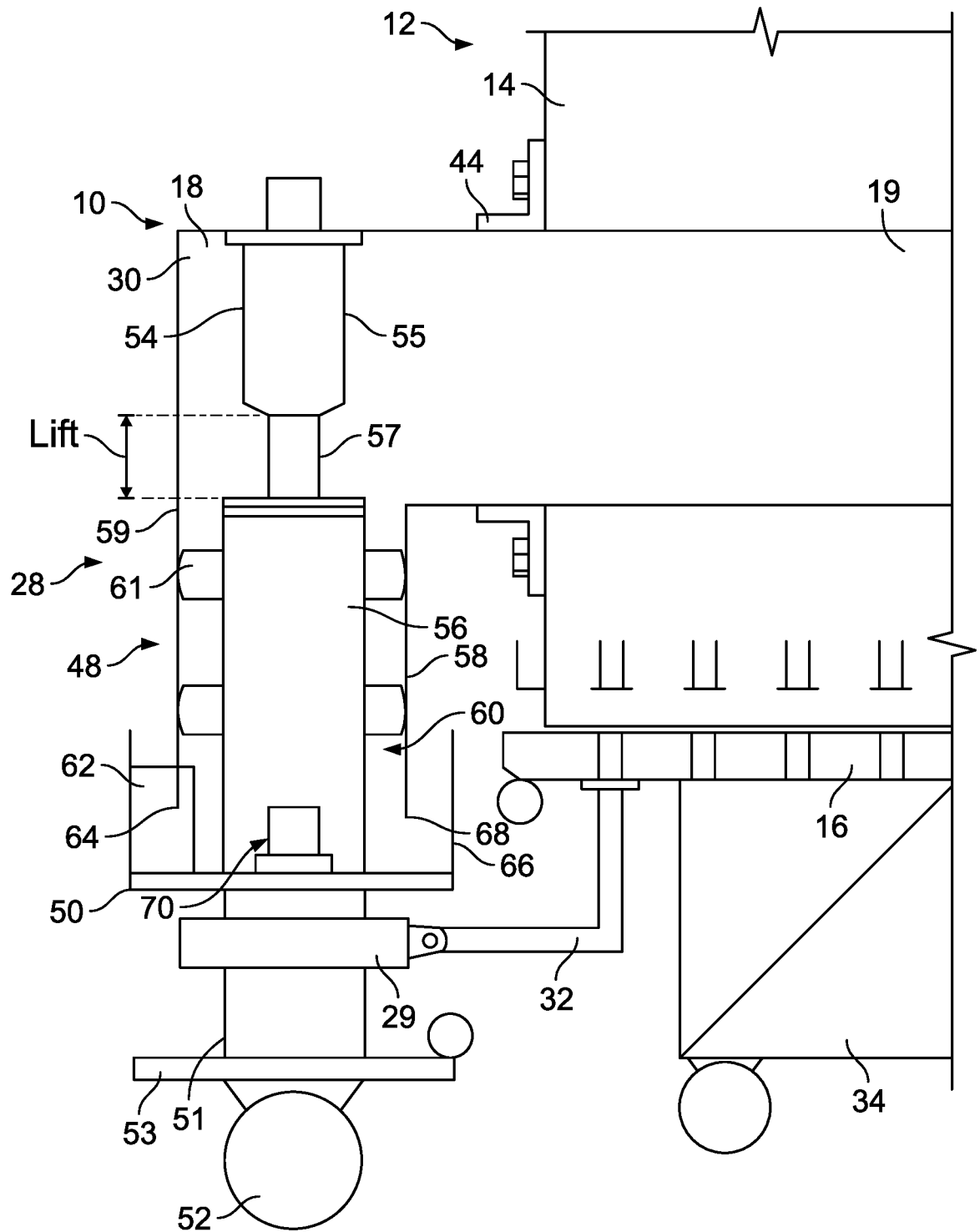
FIG. 3 is a side cross-sectional view of a leg assembly for a base assembly showing a hydraulic cylinder and swing arm in accordance with various embodiments.
Figure 4:
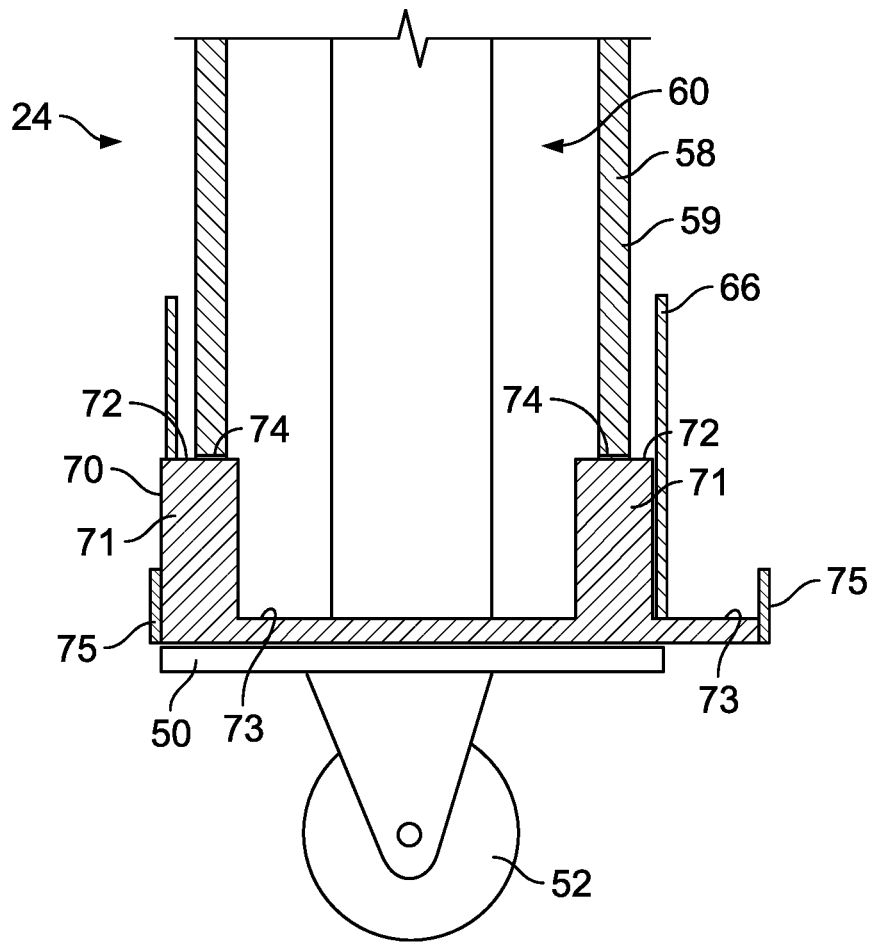
FIG. 4 is a side cross-sectional view of a leg assembly for a base assembly showing a guide block in accordance with various embodiments.

As shown in FIGS. 2-4, the lower leg assemblies 46, 48 of the rear legs 24 and front leg 28 include a base 50, a caster 52 mounted to an underside of the base 50, a hydraulic cylinder 54 including a barrel 55 and a piston rod 57, and a support 56 disposed between the base 50 and the hydraulic cylinder 54. The base 50 and support 56 are sized to position the hydraulic cylinder 54 so that movement of the piston rod 57 results in a desired amount of upward or downward movement of the frame 18 and the main tube 14. So configured, the lower leg assemblies 46, 48 provide upward and downward movement of the frame 18 by raising and lowering the piston rod 57 of the hydraulic cylinder 54. In the illustrated form, the hydraulic cylinders 54 are inverted with the barrel 55 coupled to the frame 18. This advantageously avoids movement of hydraulic hoses and other components relative to the frame 18.

In order to orient and couple the lower leg assembly 46 to the frame 18, the frame 18 includes downwardly depending tubular leg portions 58 disposed at the corners 26, 30 that have a vertical sidewall 59 extending around an interior 60 thereof. The leg portions 58 are sized so that the support 56 and the hydraulic cylinder 54 can extend upwardly into the interior 60 thereof. Bearings 61 are disposed along the height of and coupled to the support 56 to contact the leg portion sidewall 59 to orient the lower leg assembly 46 within the frame leg portion 58 as the hydraulic cylinder 54 moves the frame 18 upwardly and downwardly.

To further ensure that the frame leg portion 58 is aligned with the base 50, the base 50 can include a block 62 having a vertical slot 64 extending through a portion thereof. The block 62 is positioned on the base 50 so that the sidewall 59 of the leg portion 58 shifts therein during lifting and lowering operations. Further, the block 62 can be configured to prevent the lower leg assembly 46, 48 from rotating relative to the frame 18.

In order to shield the moving components of the support assembly 10 during lifting and lowering operations, the base 50 can include an upstanding wall 66 that extends around a perimeter thereof. As shown, the wall 66 is spaced outwardly of the sidewall 59 of the leg portions 58 and has a height to project above a lower edge 68 of the leg portions 58 with the hydraulic cylinder 54 in a raised configuration. So configured, the leg portion 58 and the wall 66 telescope with respect to one another during lifting and lower operations, which effectively prevents a user from inadvertently putting a hand or other object underneath the frame 18.

By a further approach, as shown in FIG. 4, the leg assemblies 46, 48 can include a height guide member 70 that is slidable along the base 50. The guide member 70 includes raised portions 71 that project upwardly towards the frame 18. The raised portions 71 are configured so that when the leg portion 58 is lowered, the lower edge 68 abuts a top surface 72 of the raised portion 71 resulting in the frame 18 being disposed at a height suitable for operation. For storage, a user can slide the height guide member 70 so that the raised portions 71 are misaligned with respect to the sidewall 59 and a lowering operation causes the edge 68 to abut a lower surface 73 of the guide member 70. As shown in FIG. 4, the upstanding wall 66 of the base 50 can include openings 74 extending therethrough to allow the guide member 70 to be slid to a desired position on the base 50. Further, to keep the guide member 70 disposed on the base 50, the guide member 50 can include end stops 75 that are configured to abut the upstanding wall 66 or base 50 when the guide member 50 is slid from one end to the other. By one approach, the end stops 75 can be utilized to position the guide member 70 in the raised or lowered configurations, allow a user to simply shift the guide member 70 until the desired end stop 75 prevents further movement.

Due to the high precision required to insert and remove the bottom plate 16, by one approach, the hydraulic cylinders 54 can be configured to operate in lockstep, providing synchronized up and down movement of the frame 18 and, therefore, the main tube 14. The asymmetrical loading on the three lifting leg assemblies 46, 48 due to the offset positioning of the column 12 within the frame 18 makes synchronized movement more difficult.

Figure 5:
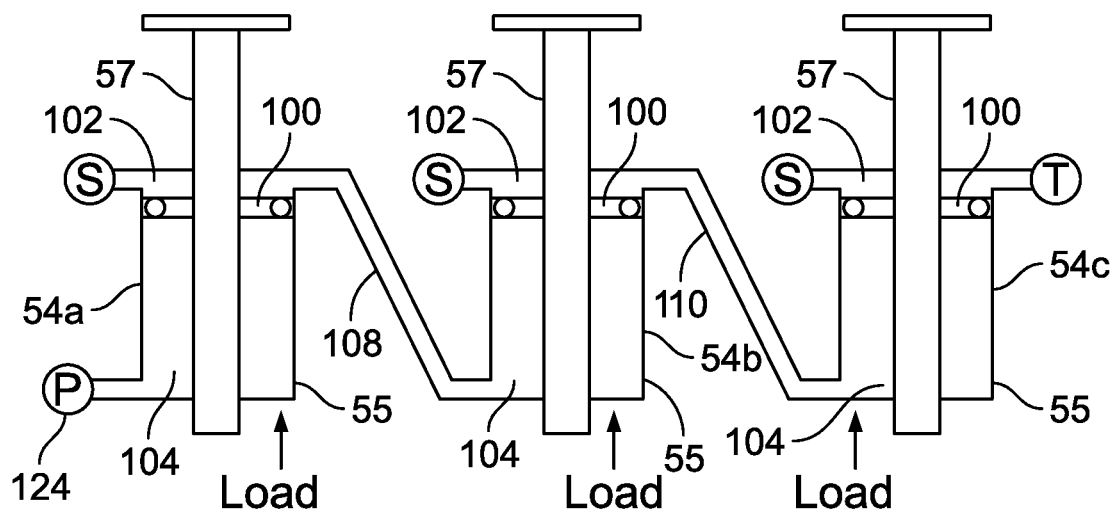
FIG. 5 is a side elevational view of the chromatography and synthesis column and base assembly of FIG. 10 with the removable leg mounted thereto in accordance with various embodiments.
Figure 6:
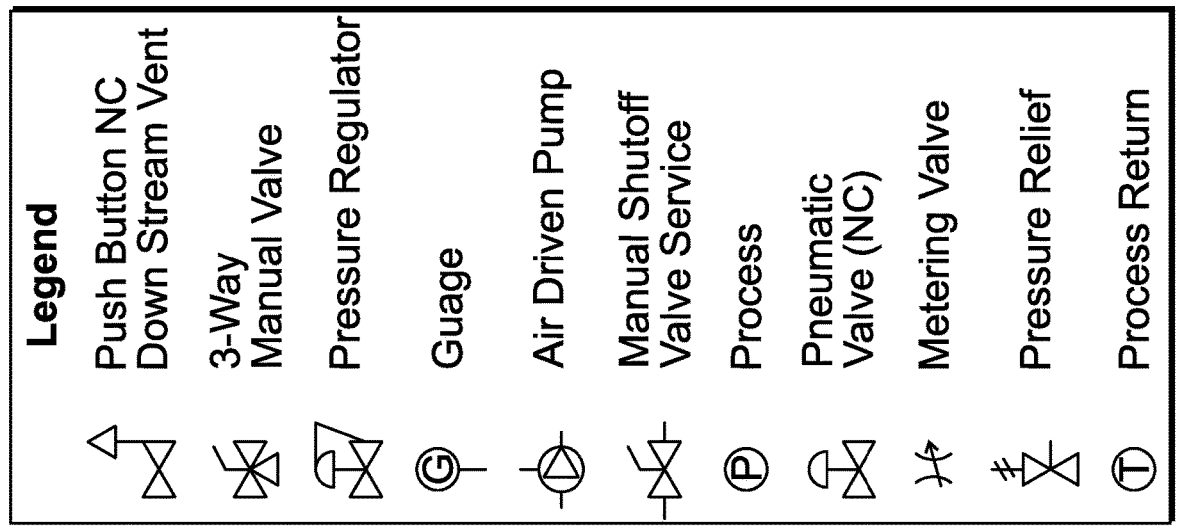
FIG. 6 is a side cross-sectional schematic view of a hydraulic cylinder system in accordance with various embodiments.
Figure 6:
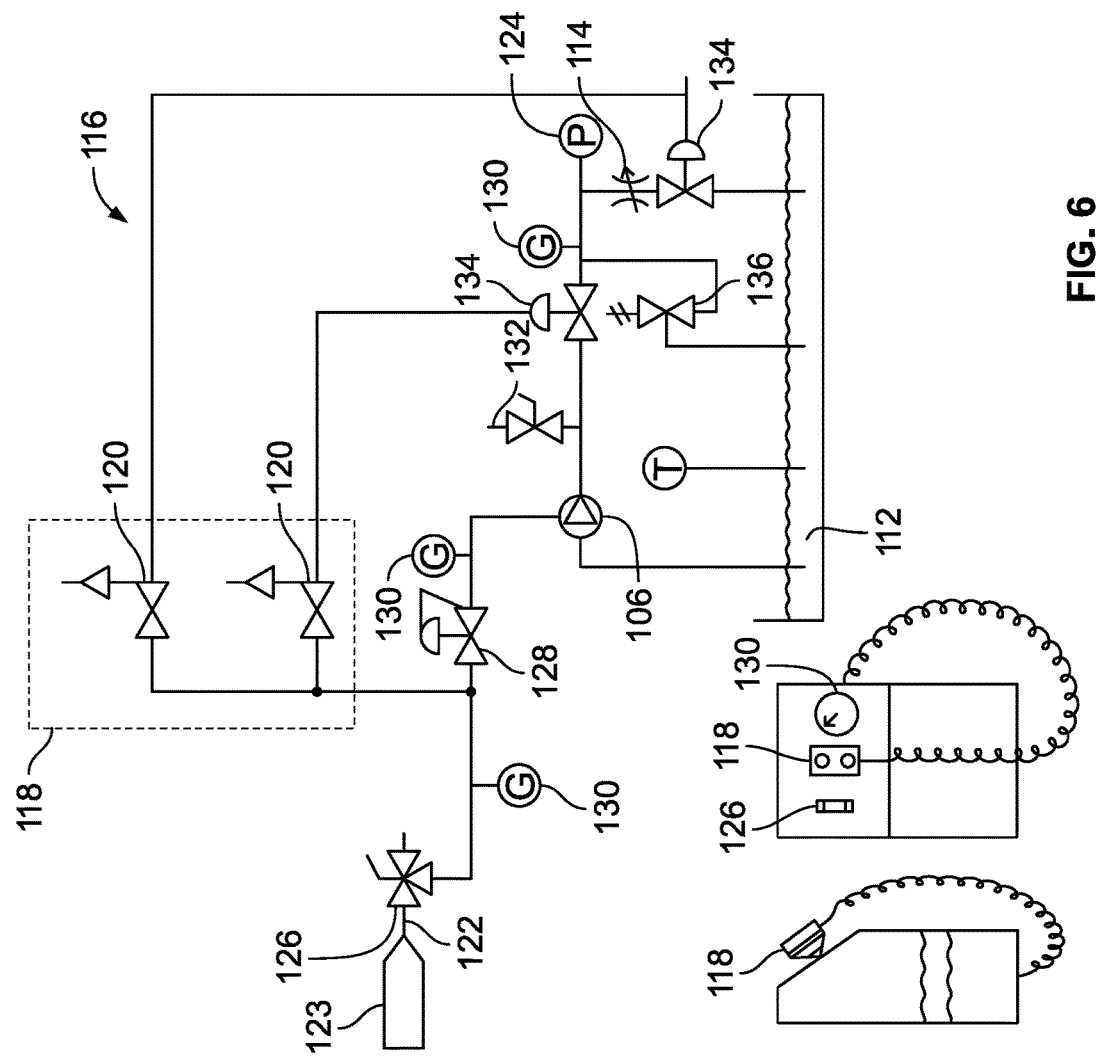

To accomplish a coordinated lift, as shown in FIG. 5, the hydraulic cylinders 54 can be double acting cylinders. The double rod configuration makes the area of the exposed piston 100 equal in each chamber 102, 104 of the double acting cylinder 54. This allows one pump 106 (FIG. 6) to synchronize multiple cylinders 54 and provide the coordinated descent of the cylinders 54 when there is an uneven load distributed across the cylinders 54. As illustrated in FIG. 5, the cylinders 54 are connected in series. A first closed system 108, which is filled with a hydraulic fluid as understood, is established between the top chamber 102 of the first cylinder 54a and the bottom chamber 104 of the second cylinder 54b. A second closed system 110 is established between the top chamber 102 of the second cylinder 54b and the bottom chamber 104 of the third cylinder 54c. As the bottom chamber 104 of the first cylinder 54a is being filled by hydraulic fluid, the top chamber 102 of the first cylinder 54a will fill the bottom chamber 104 of the second cylinder 54b. As the bottom chamber 104 of the second cylinder 54b is being filled, the top chamber 102 of the second cylinder 54b will fill the bottom chamber 104 of the third cylinder 54c. As the bottom chamber 104 of the third cylinder 54c is being filled, the top chamber 102 will express hydraulic fluid into a reservoir 112 supplying the pump 106 for the first cylinder 54a. While this hydraulic configuration of the system 108 is inefficient relative to traditional hydraulic cylinders, the double rod configuration of the cylinders 54 reduces the area of exposed piston 100 and the cylinders 54 in series adds the load on all of the cylinders 54 together and applies the total load to the reduced area of the piston 100 of the first cylinder 54a. This disadvantage can be tolerated because while the columns 12 are large, the hydraulic cylinders 54 are more than sufficient to handle the load, and operating the cylinders 54 in sync provides a significant advantage of perfectly synchronized cylinders 54 moving the frame 18, and the column 12 secured thereto, upwardly and downwardly.

Figure 9:
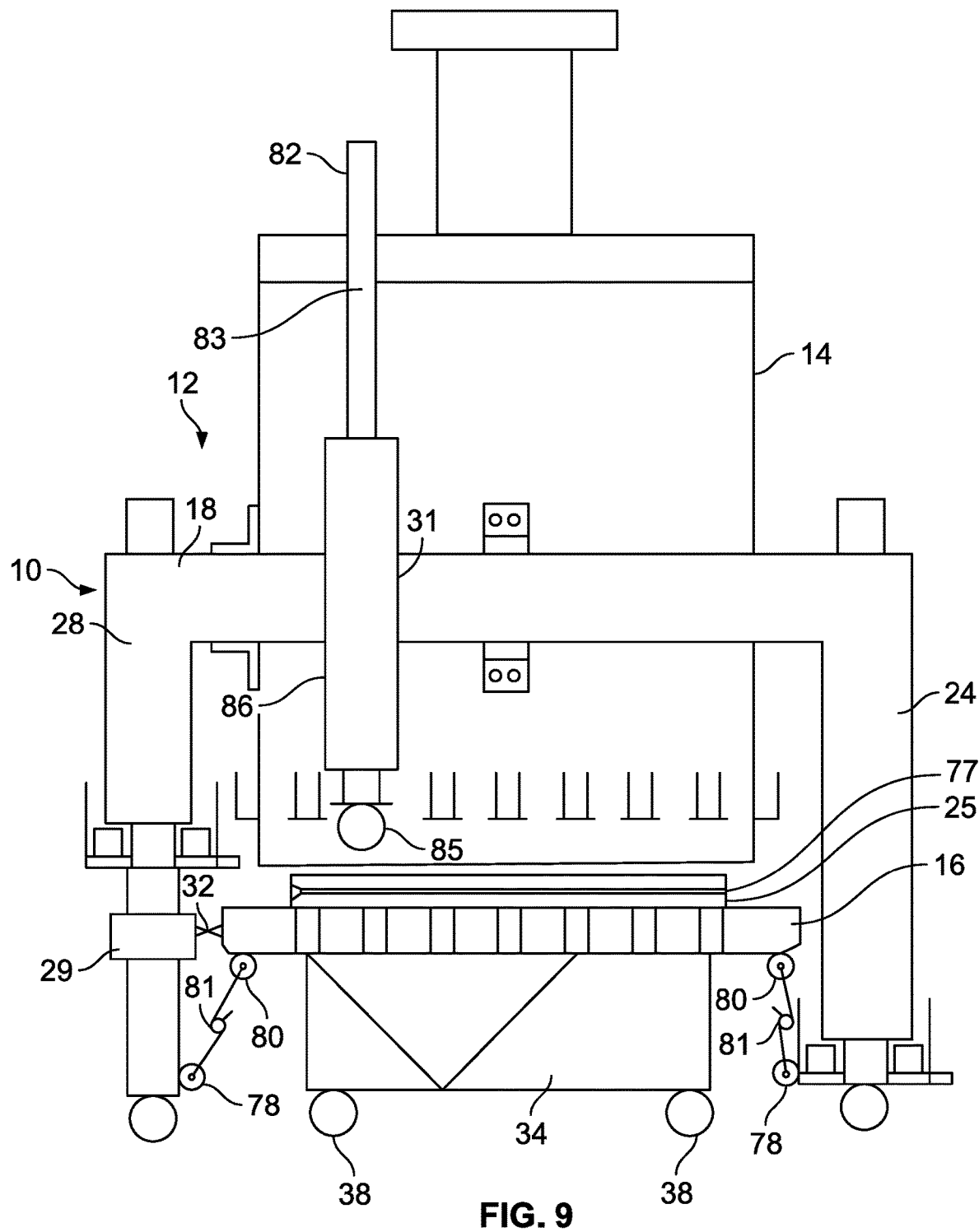
FIG. 9 is a side elevational view of a chromatography and synthesis column and base assembly with a telescoping leg in accordance with various embodiments.

The reverse operations happen when lowering the frame 18. The load of the column 12 and frame 18 is used to drive the cylinders 54 downwardly and, as shown in FIG. 9, a metering valve 114 on the first cylinder 54a defines the rate of descent of all the cylinders 54. The load pushing down on the third cylinder 54c causes the bottom chamber 104 to fill the top chamber 102 of the second cylinder 54b. At the same time, the top chamber 102 of the third cylinder 54a is filling by suction of the fluid in the reservoir 112 supplying the pump 106. The top chamber 102 of the second cylinder 54b being filled by the third cylinder 54c and the load on the second and third cylinders 54b, 54c causes the bottom chamber 104 of the second cylinder 54b to fill the top chamber 102 of the first cylinder 54a. The top chamber 102 of the first cylinder 54a being filled by the second cylinder 54b and the load on the first, second and third cylinders 54 causes the bottom chamber 104 of the first cylinder 54a to express fluid. The metering valve 114 put on the fluid flow from the bottom chamber 104 of the first cylinder 54a defines the rate of descent of all three cylinders 54. So configured, the three cylinders 54 work in lockstep to move the frame 18 and column 12 upwardly and downwardly.

FIG. 9 is a process and instrument diagram for an example air-driven hydraulic control circuit 116. As shown, the control circuit 116 is provided for driving movement of the cylinders 54 by controlling operation of the pump 106. In the illustrated form, the pump 106 is an air-over-hydraulic pump and the control circuit 116 is air driven. It will be understood that other circuits, including electrical, could alternatively be utilized to accomplish the hydraulic pump and control circuit. By one approach, a user can provide input to the control circuit 116 using a pendent 118 having pushbutton vents 120 to provide convenience for the operator and to facilitate one-man operation. It will be understood that the valve components of the pendent 118 can be located elsewhere and/or alternative embodiments for the circuit can perform the same or similar functions.

The control circuit 116 includes an inlet 122 from an air supply 123 suitable to drive the pump 106 to the pressure required by the cylinders 54 to lift the frame 18 and column 12 and an outlet 124 connected to the cylinders 54. As shown, the control circuit 116 can further utilize a 3-way manual valve 126 as an on/off control, a pressure regulator 128, various pressure gauges 130, a manual shut-off service valve 132, pneumatic valves 134, and a pressure relief valve 136.

With the control circuit 116 shown in FIG. 9, movement of the cylinders 54 can be locked out by the on/off valve 126 which simultaneously vents the pneumatics whether the cylinders 54 are moving or sitting idle. A first pressure gauge 130 is included so the inlet air pressure can be confirmed when the on/off valve 126 is in the on position and that the pneumatic pressure is vented when the on/off valve 126 is in the off position. The pendent 118 has two pneumatic valves 120 that are normally closed. To lower the frame 18 and column 12, the "down" valve 120 is in communication with the on/off valve 126 and the actuator of the down shutoff valve 134. To raise the frame 12 and column 12, the "up" valve 120 is in communication with the on/off valve 126 and the actuator of the up-shutoff valve 134. The pressure regulator 128 is in communication with the on/off valve 126 and the air side of the air driven pump 106. A second gauge 130 is in communication with the pressure regulator 128 and the air side of the air driven pump 106. The liquid side of the air driven pump 106 is in communication with the fluid in the hydraulic fluid reservoir 112 and the up-shutoff valve 134. The pressure relief valve 136 is in communication with the hydraulic fluid reservoir 112, the up-shutoff valve 134, the metering valve 114, and the output 124 to the hydraulic cylinders 54. A third pressure gauge 130 is in communication with the up-shutoff valve 134, the pressure relief valve 136, the metering valve 114, and the output 124 to the hydraulic cylinders 54.

Figure 7:
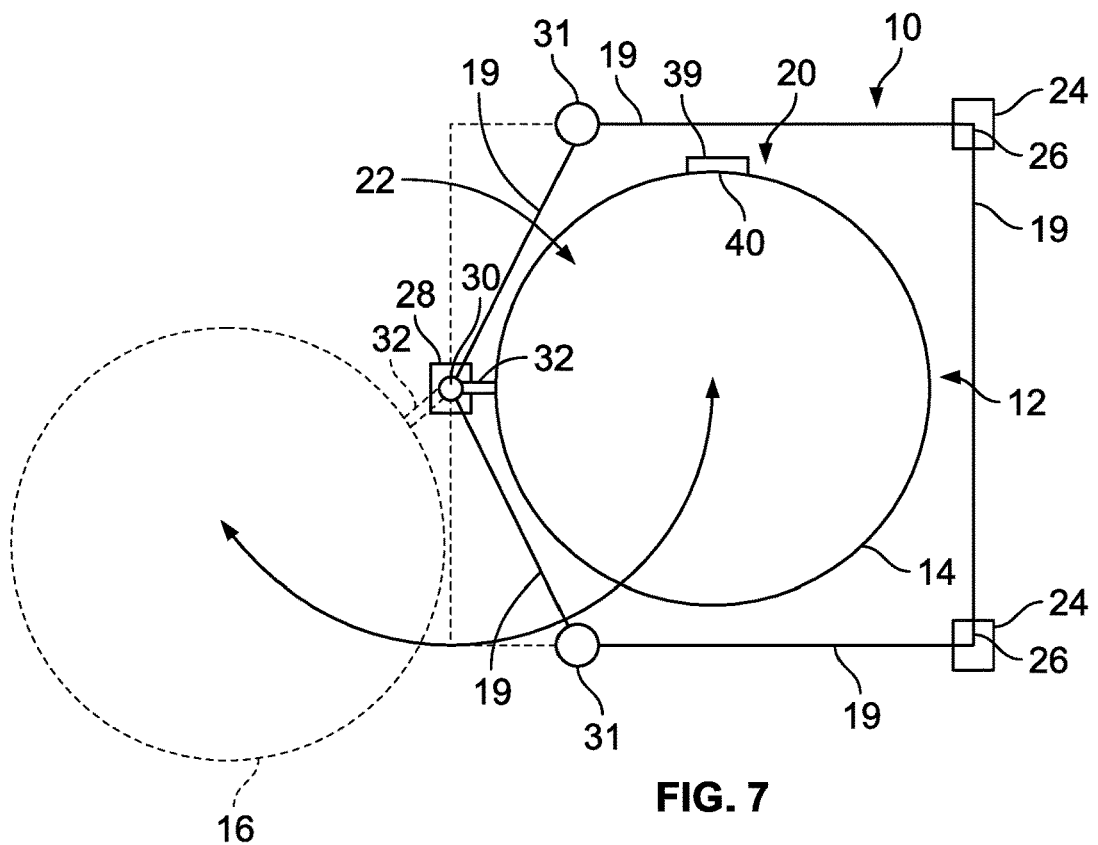
FIG. 7 is a top schematic view of a chromatography and synthesis column and base assembly with a swing arm configured to guide pivoting of a bottom plate in accordance with various embodiments.

As discussed above, the bottom plate 16 of the column 12 is removed for many maintenance actions. In order to easily and repeatably move the bottom plate 16 from underneath the main tube 14 and realign the bottom plate 16 with the main tube 14, a swing arm 32 is provided that pivotably couples the bottom plate 16 to the support assembly 10 at the front support leg 28 via a bearing 29 (FIG. 3). The swing arm 32 is rigid so that the bottom plate 16 can be pivoted along a set radius from the front support leg 28. Advantageously, as shown in FIG. 7, the three-legged configuration of the support assembly 10 provides sufficient clearance between the front leg 28 and the rear legs 24 so that the bottom plate 16 can easily pass therebetween.

Figure 8:
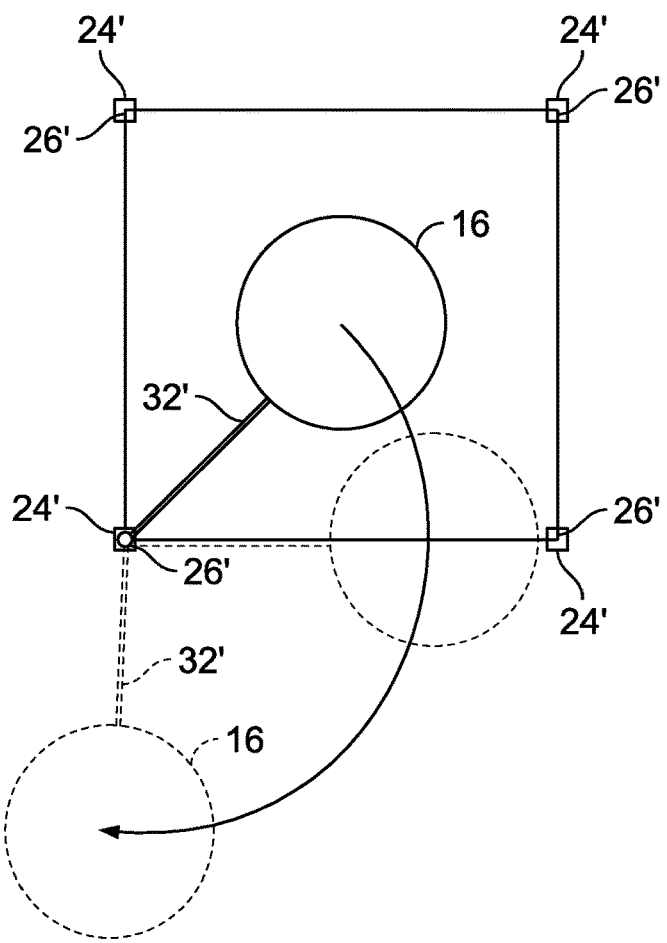
FIG. 8 is a top schematic view of an alternative chromatography and synthesis column and base assembly with a swing arm configured to guide pivoting of a bottom plate in accordance with various embodiments.

In an alternative embodiment as shown in FIG. 8, a frame 18' can have a rectangular configuration where the legs 24 are spaced a sufficient distance from one another for the bottom plate 16 to be pivoted between two adjacent legs by a rigid swing arm 32'. While this configuration may be suitable for many purposes, the footprint of the frame 18' is larger in comparison to the size of the column 12 as with the above embodiment.

By one approach, as shown in FIG. 9, to aid in moving the bottom plate 16, the bottom plate 16 can be mounted to a carriage 34 having a housing 36 or other supporting framework and casters 38. The carriage 34 allows the weight of the bottom plate 16 to be supported on the casters 38 rather than a separate lifting device, such as a fork lift. With this configuration, a user can easily maneuver the carriage 34 on the casters 38, which avoids the precarious movements of a lift device. Moreover, the carriage 34, along with the swing arm 32, ensures that movement of the bottom plate 16 is precisely controlled along the radius of the swing arm 32 so that contact, and any resulting damage, between the bottom plate 16 and the support assembly 10 is prevented.

As discussed above, moving the bottom plate 16 back underneath the main 14 to insert a plug portion 25 thereof into the main tube 14 requires that the bottom plate 16 be aligned translationally, rotationally, and horizontally with the main tube 14. The swing arm 32 advantageously provides easy, repeatable alignment because the bottom plate 16 can be fixedly mounted to the swing arm 32 so that the plate 16 cannot rotate relative to the swing arm 32 and the swing arm 32, and carriage 34, can maintain the bottom plate 16 in an horizontal orientation. Further, a stop 39 can be mounted to the support assembly 10 and/or the main tube 14 so that an inwardly facing surface 40 of the stop 39 positions the bottom plate 16 in translational alignment with the main tube 14 when the bottom plate 16 abuts the surface 40. So configured, a user can simply push the bottom plate 16 on the carriage 34 and the swing arm 32 will direct movement along the radius thereof until the bottom plate 16 contacts the stop 39.

A lifting mechanism, such as the hydraulics 54 discussed above, can further be utilized to reliably remove the bottom plate 16 from the main tube 14. As discussed above, the bottom plate 16 includes a plug portion 25 that projects into and seals against an interior surface 76 of the main tube 14 with one or more seals 77. As shown in FIG. 9, the lower leg assemblies 46, 48 can include an anchor 78, such as a ring as illustrated, and the bottom plate 16 can include a corresponding anchor 80. A removable or releasable coupling 81 can then be installed between the anchors 78, 80 to couple the bottom plate 16 to the lower leg assemblies 46, 48 when the frame 18 is in the lowered position holding the bottom plate 16 in a fixed position. In the illustrated form, the three couplings 81 to the rear and front legs 24, 28 hold the bottom plate 16, so that, when the hydraulic cylinders 54 raise the frame 18, the bottom plate 16 and carriage 34 remain stationary. As the main tube 14 is raised, the plug portion 25 is pulled from within the main tube 14 until the plug portion 25 has sufficient clearance from the main tube 14. Thereafter, the couplings 81 can be removed or released and the bottom plate 16 can be pivoted on the swing arm 32 to a position exterior of the frame 18 through the spacing between the front and rear legs 28, 24 as discussed above. It will be understood that the anchors 78, 80 and couplings 81 can take any suitable form, such as hooks, straps, fasteners, and so forth. Further, in another form, the carriage 34 can include one or more of the anchors 78 rather than the bottom plate 16.

Referring back to FIG. 3, due to the swing arm 32, the lower leg assembly 48 of the front leg 28 can be modified relative to the rear legs 24 to include structure in addition to the components described above. More specifically, the lower leg assembly 48 includes a lower support 51 and base 53, with the caster 52 mounted to the lower base 53. The lower support 51 has a cylindrical configuration and is sized so that the bearing 29 of the swing arm 32 coupled thereto can freely rotate and has room to move upwardly and downwardly as the hydraulic cylinders 54 move the frame 18.

Figure 10:
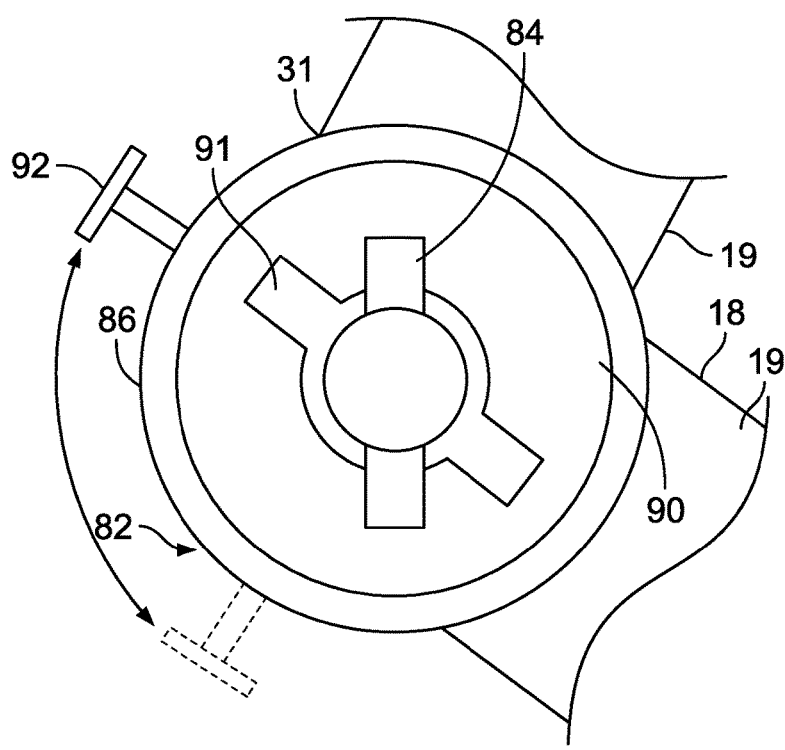
FIG. 10 is a top cross-sectional view of the telescoping leg of FIG. 7 in accordance with various embodiments.
Figure 11:
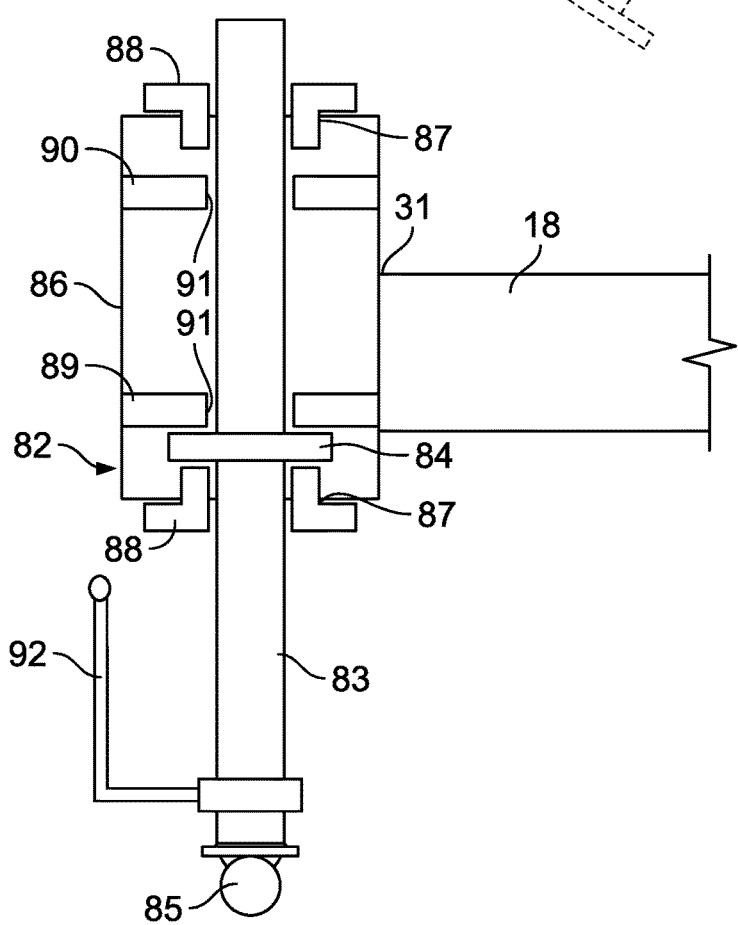
FIG. 11 is a side cross-sectional view of the telescoping leg of FIG. 7 in accordance with various embodiments.
Figure 12:
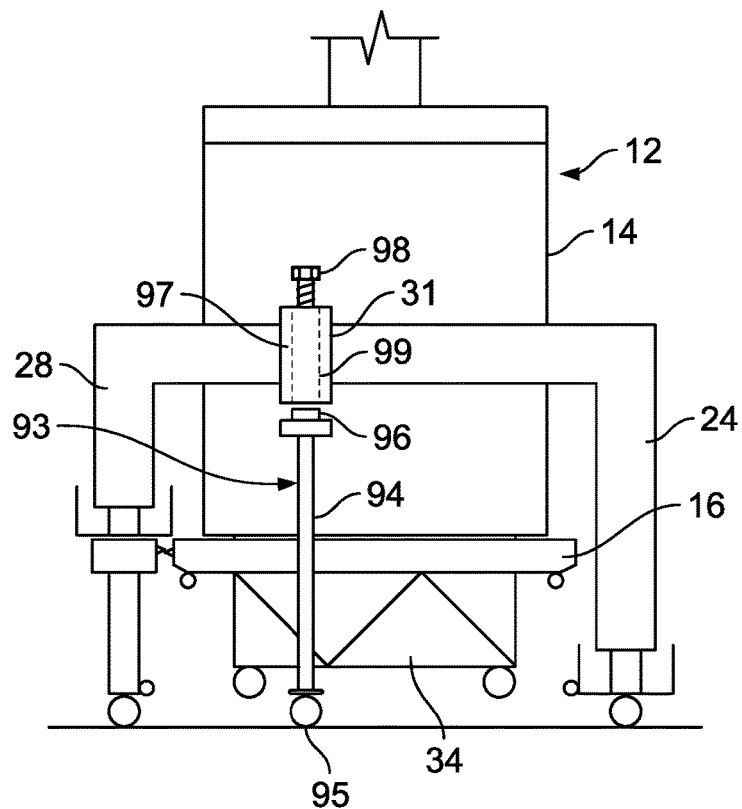
FIG. 12 is a side elevational view of a chromatography and synthesis column and base assembly with a removable leg being mounted thereto in accordance with various embodiments.
Figure 13:
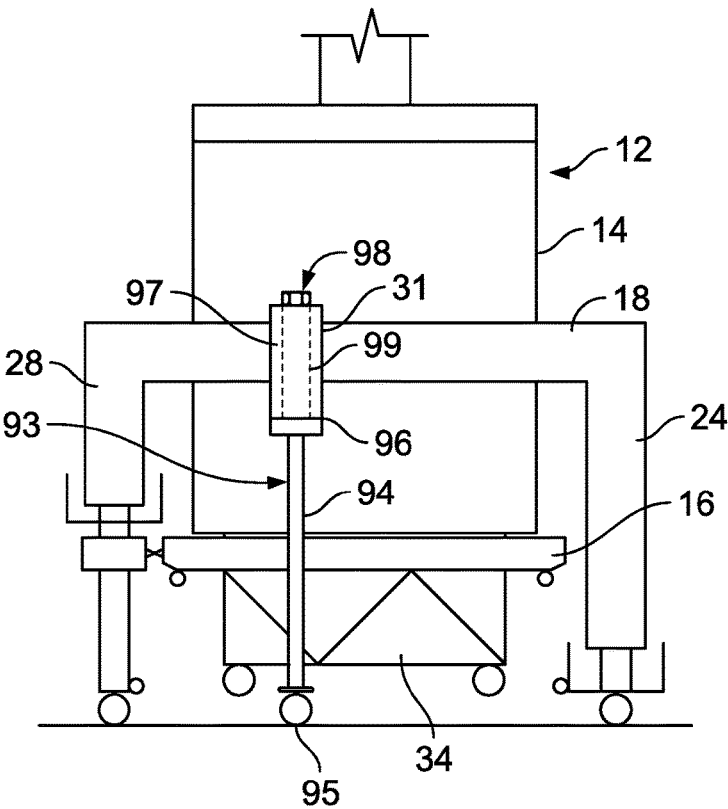
FIG. 13 is a diagrammatic view of an air driven hydraulic control circuit in accordance with various embodiments.

As is understood, support assemblies 10 having three legs may result in less stable movement for the column 12, especially where the weight of the column 12 has asymmetrical loading as with the frame 18 discussed above. To provide additional support, as shown in FIGS. 9-11, the support assembly 10 can include telescoping legs 82 at intermediate corners 31 of the frame 18 between the rear corners 26 and the front corner 30. By having a telescoping functionality, the legs 82 can be moved out of the path of the bottom plate 16 as the bottom plate is moved out from beneath the main tube 14, such as by using the swing arm 32 described above.

As shown in FIGS. 10 and 11, each telescoping leg 82 includes an elongate shaft 83 with a cross bar 84 extending outwardly from an intermediate portion thereof and a caster 85 mounted on a distal end thereof. A telescoping housing 86 is mounted to the frame 18 at the corner 31. The housing 86 includes openings 87 extending through the top and bottom thereof so that the leg 82 can extend therethrough. If desired, the housing 86 can include bearings 88 disposed around the openings 87 to align and aid in movement of the leg 82.

As shown, the housing 86 includes first and second position plates 89, 90 that extend across the interior of the housing 86. The first and second position plates 89, 90 each further include a key opening 91 that extends vertically therethrough that has a shape corresponding to the cross bar 84 of the leg 82. The first position plate 89 is disposed at a height so that with the cross-bar 84 positioned below the first position plate 89, as shown in FIG. 11, the leg 82 is aligned with the other legs 24, 28 of the support assembly 10. As such, the support assembly 10 in this configuration has five legs to support the weight of the column 12 and provides stable movement. The second position plate 90 is disposed above the first position plate 89 and is configured to hold the leg 82 in an elevated position out of the way for removal of the bottom plate 16. To move the leg 82 to the elevated position, a user can align the cross bar 84 with the key opening 91 of the first position plate 89 and, subsequently, the key opening 91 of the second position plate 90. Thereafter, the user can rotate the leg 82 so that the cross bar 84 is not aligned with the key opening 91 and the weight of the leg 82 is supported on the second position plate 90. If desired, each leg 82 can include a handle 92 secured thereto to help a user to move the leg 82 to the elevated position.

By another approach, in order to provide increased stability for the support assembly 10, the corners 31 of the frame 18 can be utilized for the attachment of removable legs 93. The removable legs 93 include an elongate shaft 94, casters 95 mounted at a distal end of the shaft 94, and a coupling portion 96 at a proximal end of the shaft 94. The corners 31 include a corresponding coupling portion 97 so that the legs 93 can be removably secured thereto. In the illustrated form, the leg coupling portion 96 includes a threaded fastener 98 that can be inserted through a throughbore 99 extending through the frame 18 and into the proximal end of the shaft 88. By another approach, the leg 93 can include a threaded fastener and the throughbore 99 can be threaded and/or a nut can secure the leg 93 to the frame 18. It will be understood that other coupling methods, such as snap-fit, friction, and so forth, are within the scope of this disclosure.

Attaching and removing the removable legs 93 can be aided by frame lifting mechanisms, such as the hydraulics 54 discussed above. More specifically, the hydraulics 54 can lift the frame 18 to a raised position and the removable legs 93 can then easily be secured to the frame 18 as discussed above. Thereafter, the hydraulics 54 can lower the frame 18 until all of the legs 24, 28, 93 support the cylinder 12 for movement. When removal of the bottom plate 16 is desired, the frame 18 can then be lifted and the legs 93 removed so that the bottom plate 16 can be pivoted out between the front 28 and rear legs 24, as discussed above.

Figure 14:
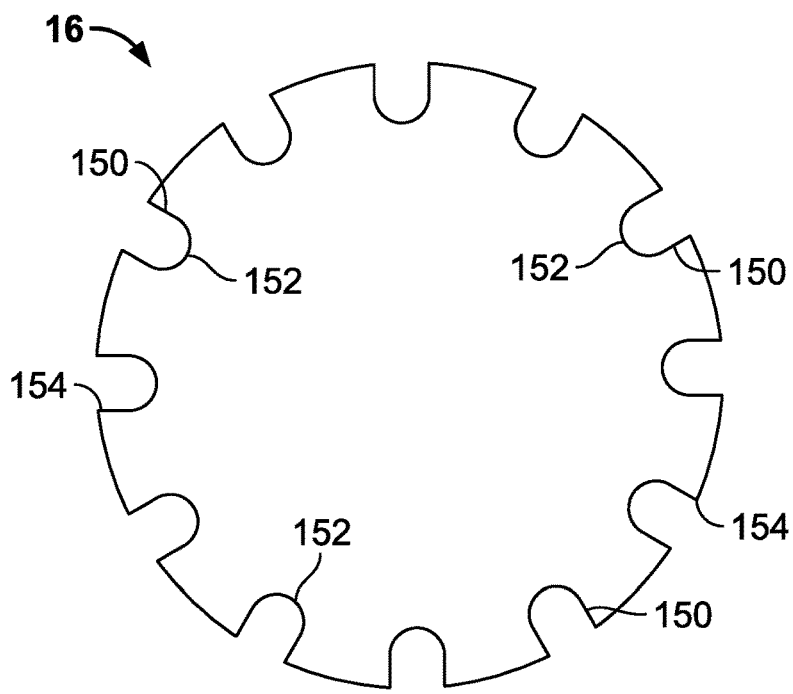
FIG. 14 is a top plan view of a bottom plate for a chromatography and synthesis column with radially opening slots in accordance with various embodiments.

In a further embodiment shown in FIGS. 14-17, the bottom plate 16 can be easily secured to the main tube 14 without the use of bolts as with the conventional method. As shown in FIG. 14, the bottom plate 16 has a gear shaped configuration with an array of radially opening slots 150 extending through the bottom plate 16. The slots 150 have a curved interior end 152 with a rectangular radial opening 154 in the illustrated form, but other suitable configurations can be contemplated.

Figure 15:
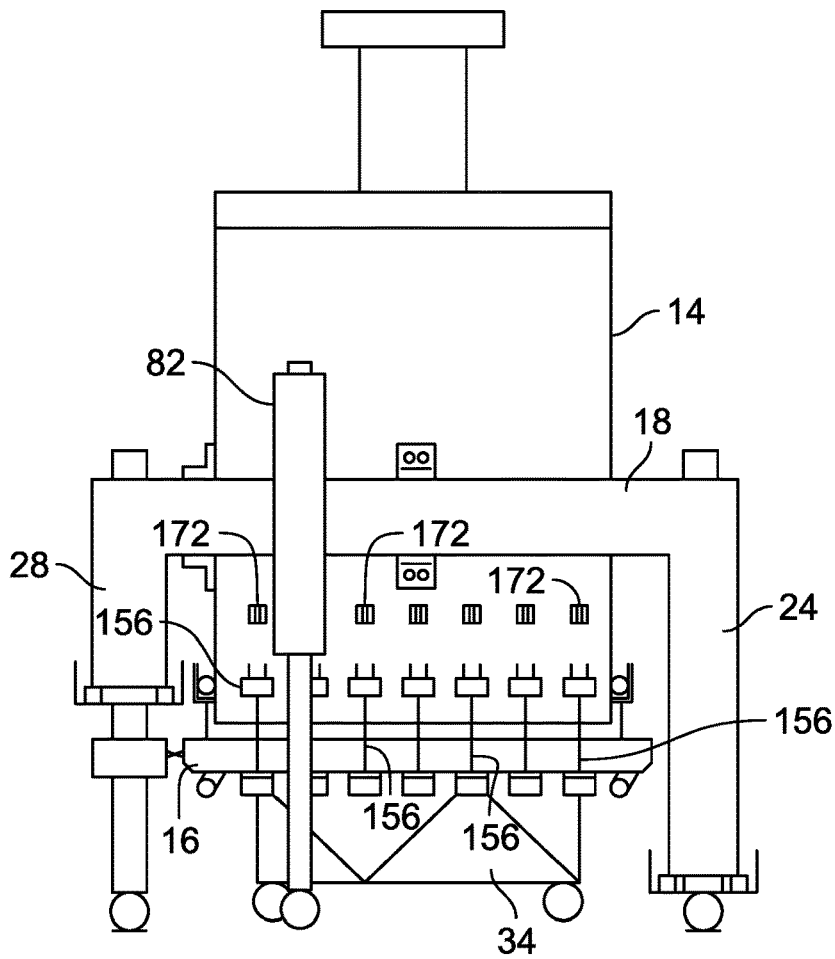
FIG. 15 is a side plan view of a chromatography and synthesis column including the bottom plate of FIG. 14 and a main tube showing pendulum members to secure the bottom plate to the main tube in accordance with various embodiments.
Figure 16:
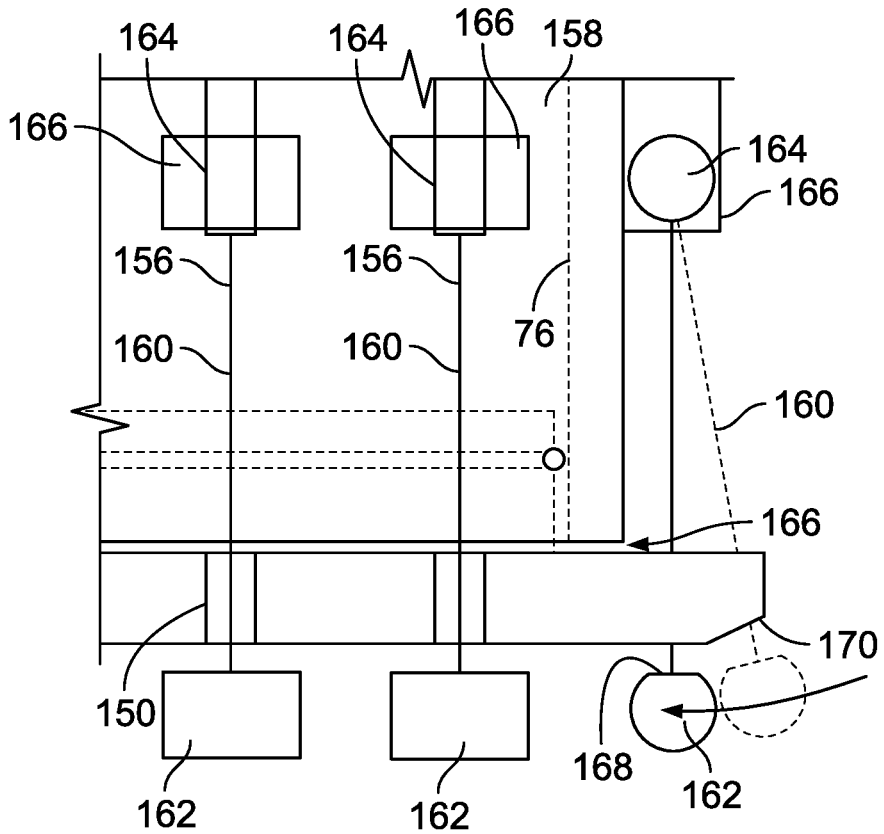
FIG. 16 is a sectional side view of the chromatography and synthesis column of FIG. 15 in accordance with various embodiments.
Figure 17:
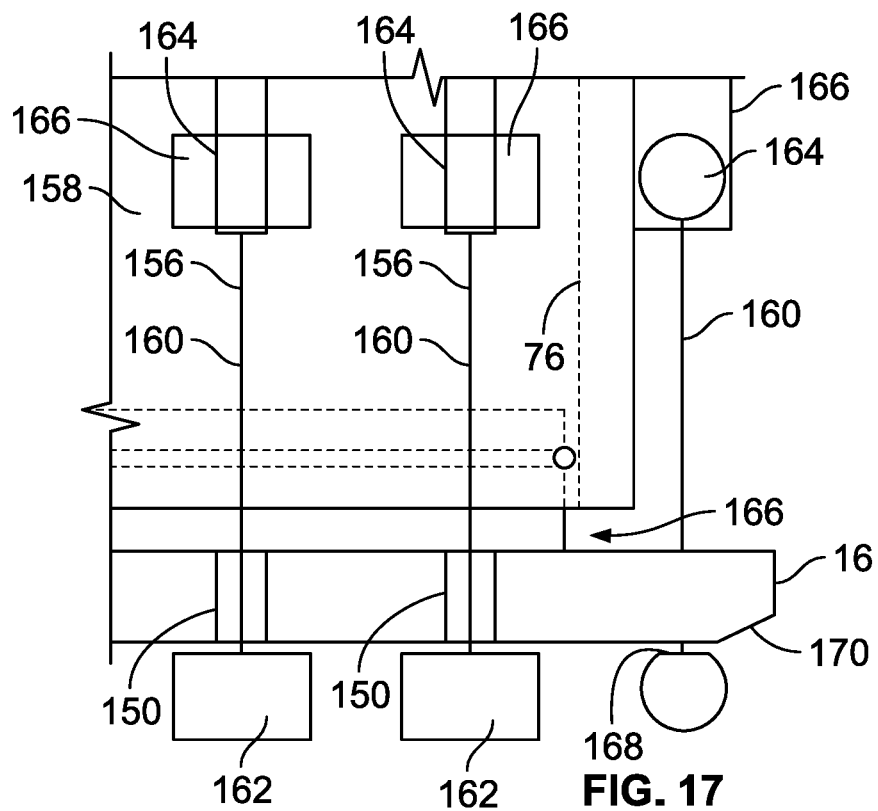
FIG. 17 is a sectional side view of the chromatography and synthesis column of FIG. 15 in accordance with various embodiments.

As shown in FIGS. 15-17, the main tube 14 has a plurality of pendulum members 156 that are pivotably coupled to an exterior 158 of the main tube 14 at spaced radial positions. Each pendulum member 156 includes a stem portion 160, a distal, enlarged retaining portion 162, and a proximal end 164. Each pendulum member 156 can be coupled to the main tube 14 by any suitable method, including brackets 166 as shown. For example, in the illustrated form, the pendulum members 102 are I-bars and the proximal end 164 is retained with the brackets 166 secured to the main tube 14 so that the pendulum members 156 can be pivoted along a vertical plane. So configured, to secure the bottom plate 16 to the main tube 14, a user can pivot each of the pendulum members 156 so that the retaining portions 162 are disposed below the bottom plate 16, which prevents the bottom plate 16 from being removed.

By one approach, the stem portion 160 of each pendulum member 156 is sized so that the retaining portion 162 can clear the bottom plate 16 when the plug portion 25 thereof is fully received within the main tube 14, i.e., the hydraulic cylinders 54 are lowered to make the main tube 14 fully seat on the bottom plate 16 and compress a compliance gap 166. Thereafter, as a result of gravity, packing, or other operation, the plug portion 25 of the bottom plate 16 slides downwardly to expand the compliance gap 166 and abut the retaining portions 110 of the pendulum members 102. The seal between the plug portion 25 and the main tube 14 remains hermetic through this movement because the seal is an internal seal and the seal 77 is spaced from the bottom plate 16 a sufficient distance to allow for the expansion of the compliance gap 166. As a result, the pendulum members 102 capture the bottom plate 16 and secure the bottom plate 16 to the main tube 14 without the use of bolts. By one approach, a lower outer corner 170 of the bottom plate 16 can be chamfered or rounded to reduce the arcuate path of the retaining portion 110 to pivot to a position below the bottom plate 16. If desired, the retaining portions 162 can have a flat radially inward surface 168 to provide a larger seating area for the bottom plate 16. As shown in FIGS. 16 and 17, the proximal end 164 of each pendulum member 156 can have a similar configuration as the retaining portion 162. With this configuration, the flat surface 168 can provide a distinguishing feature for a user installing the pendulum members 156.

Similarly, to remove the bottom plate 16, a user can lower the main tube 14, or raise the bottom plate 16, so that the plug portion 25 is inserted further therein and the compliance gap 166 is reduced. With this insertion, the retaining portions 162 will be spaced from the bottom plate 16, which allows a user to pivot the pendulum members 156 to a storage position spaced radially from or disposed above the bottom plate 16. By one approach, coupling brackets 172 can be mounted to the main tube 14 above the pivoting brackets 166. The coupling brackets 172 can be configured to retain the pendulum members 156 in a generally vertical orientation by clips, snap-fit, friction-fit, or other suitable methods.

Figure 18:
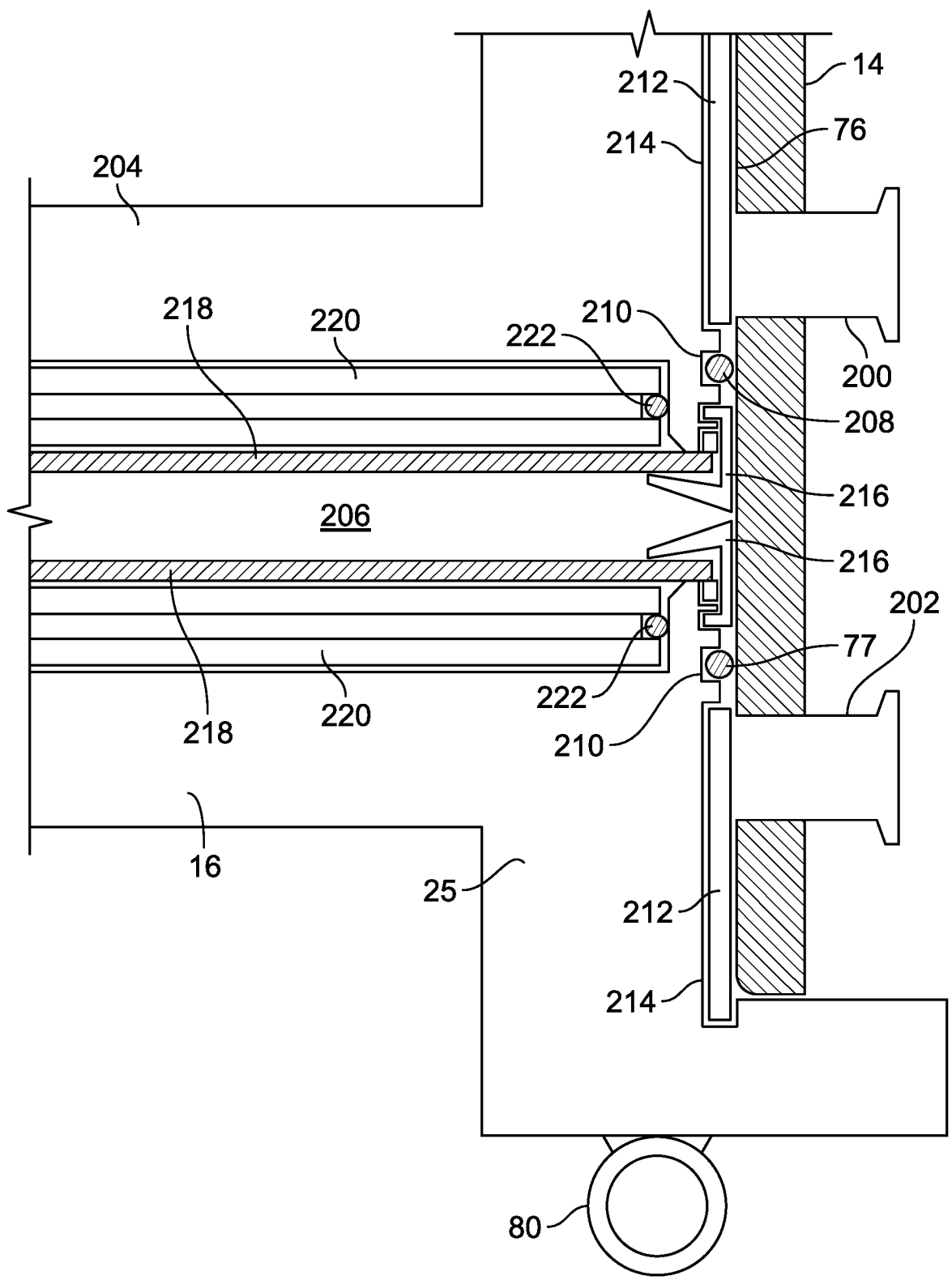
FIG. 18 is a side cross-sectional view of a chromatography and synthesis column with a bottom plate inserted to cover a slurry port in accordance with various embodiments.
Figure 19:
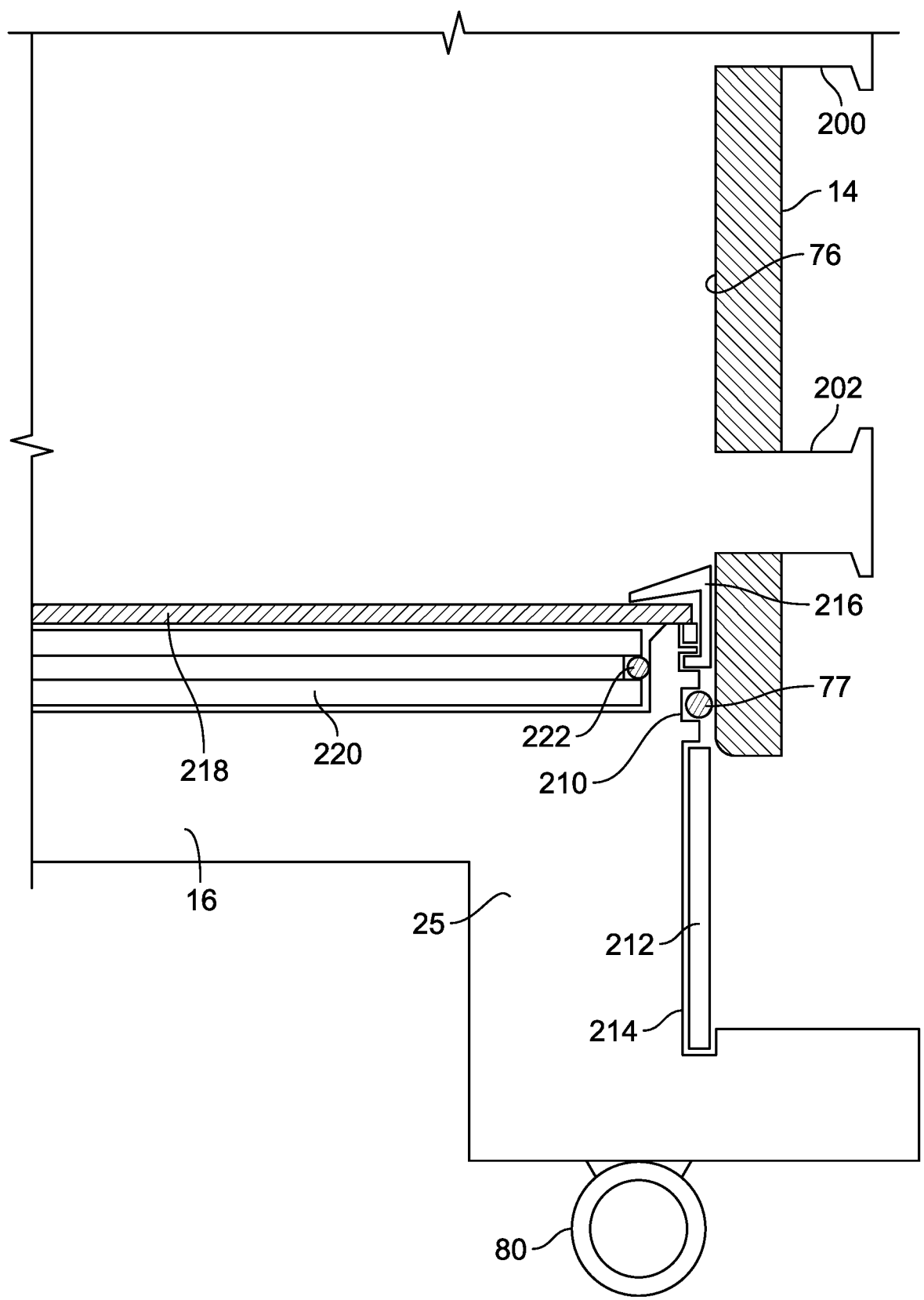
FIG. 19 is a side cross-sectional view of the chromatography and synthesis column of FIG. 18 in accordance with various embodiments.

A further embodiment for the column 12 is shown in FIGS. 18 and 19 where the main tube 14 includes upper and lower slurry ports 200, 202. In operation, the bottom plate 16 is coupled to the main tube 14 and a piston 204 is driven downwardly to pack the bed 206 between the piston 204 and the bottom plate 16. A seal 208 of the piston 204 and the bottom plate seal 77 extend circumferentially around the piston 204 and bottom plate 16 respectively within a seal groove 210. The piston 204 and bottom plate 16 each further include a glide ring 212 disposed within a groove 214 extending circumferentially around the piston 204 and bottom plate 16 respectively. As shown, the piston 204 and bottom plate 16 can further include a scraper seal 216, a fritt 218, and a distributor plate 220 with a seal 222.

In this embodiment, the plug portion 25 of the bottom plate 16 has a larger depth than conventional plates so that the plug portion 25 projects further into the main tube 14. This additional depth can be utilized so that the seal 77 is driven past the lower slurry port 202 for operation. In the illustrated form, the glide ring 212 extends across the lower slurry port 202. The hydraulics 54 configuration described above can advantageously be utilized to drive the additional depth of the bottom plate 16 into the main tube 14.

Similarly, the piston 204 is driven downwardly within the main tube 14 so that the seal 208 is disposed below the upper slurry port 200 and the glide ring 212 extends across the upper slurry port 200. So configured, the lower and upper slurry ports 200, 202 are hidden to avoid disturbing the plug flow and to obtain better chromatography, i.e., higher plate count, HETP.

Advantageously, the upper and lower slurry ports 200 can be utilized to re-slurry or process soft beds in the column 12. Additionally, the upper and lower slurry ports 200 can be utilized to transfer the bed 206 in a closed system. To utilize these features, the piston 204 is raised to expose the upper slurry port 200 and the bottom plate 16 is lowered to expose the lower slurry port 202, such as by use of the hydraulics 54 and removable couplings 81 described above.

Figure 20:
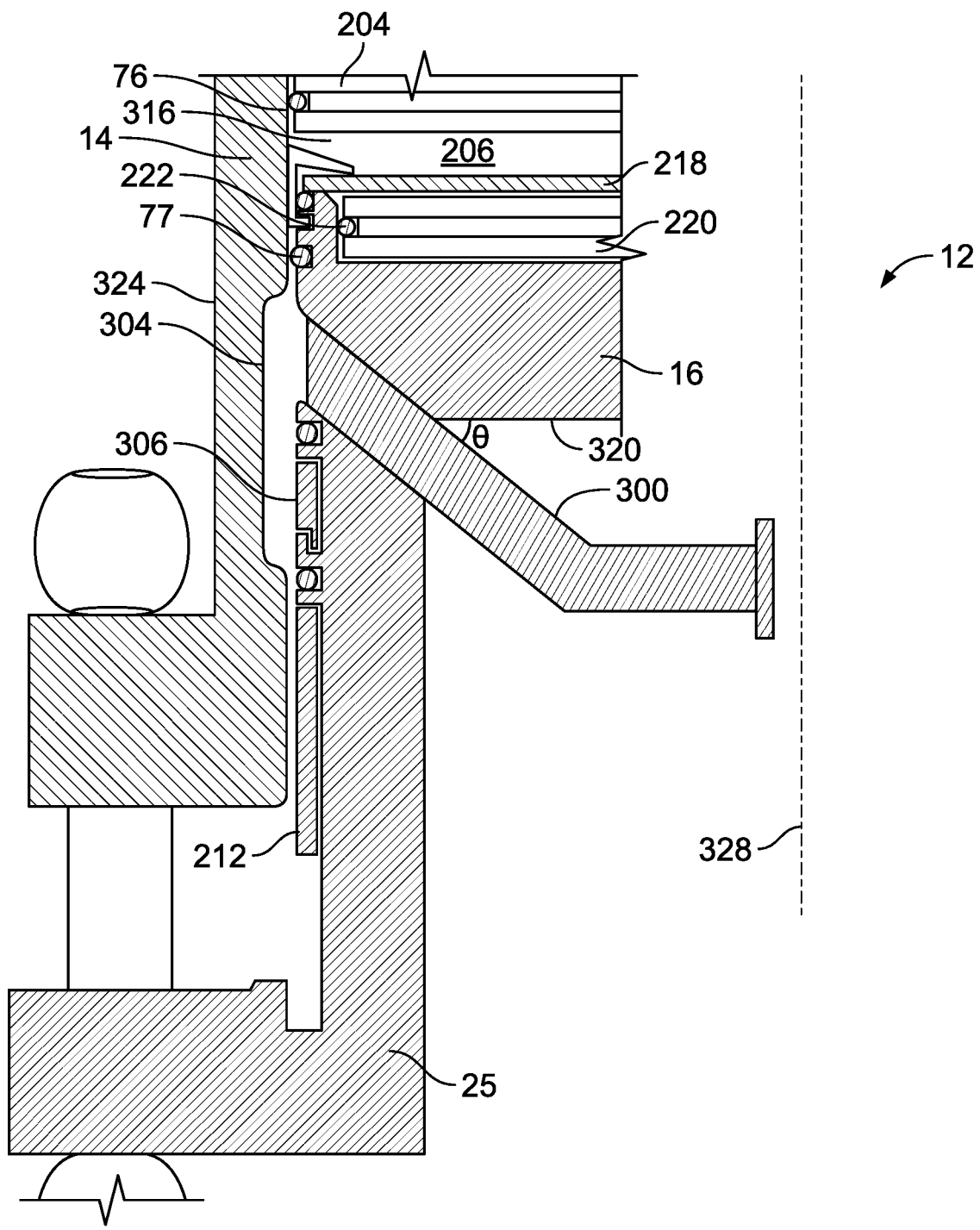
FIG. 20 is a cross-sectional view of a portion of a chromatography and synthesis column with an internal groove and lower media ports in accordance with various embodiments, showing a bottom plate in a first position relative to a main tube.
Figure 21:
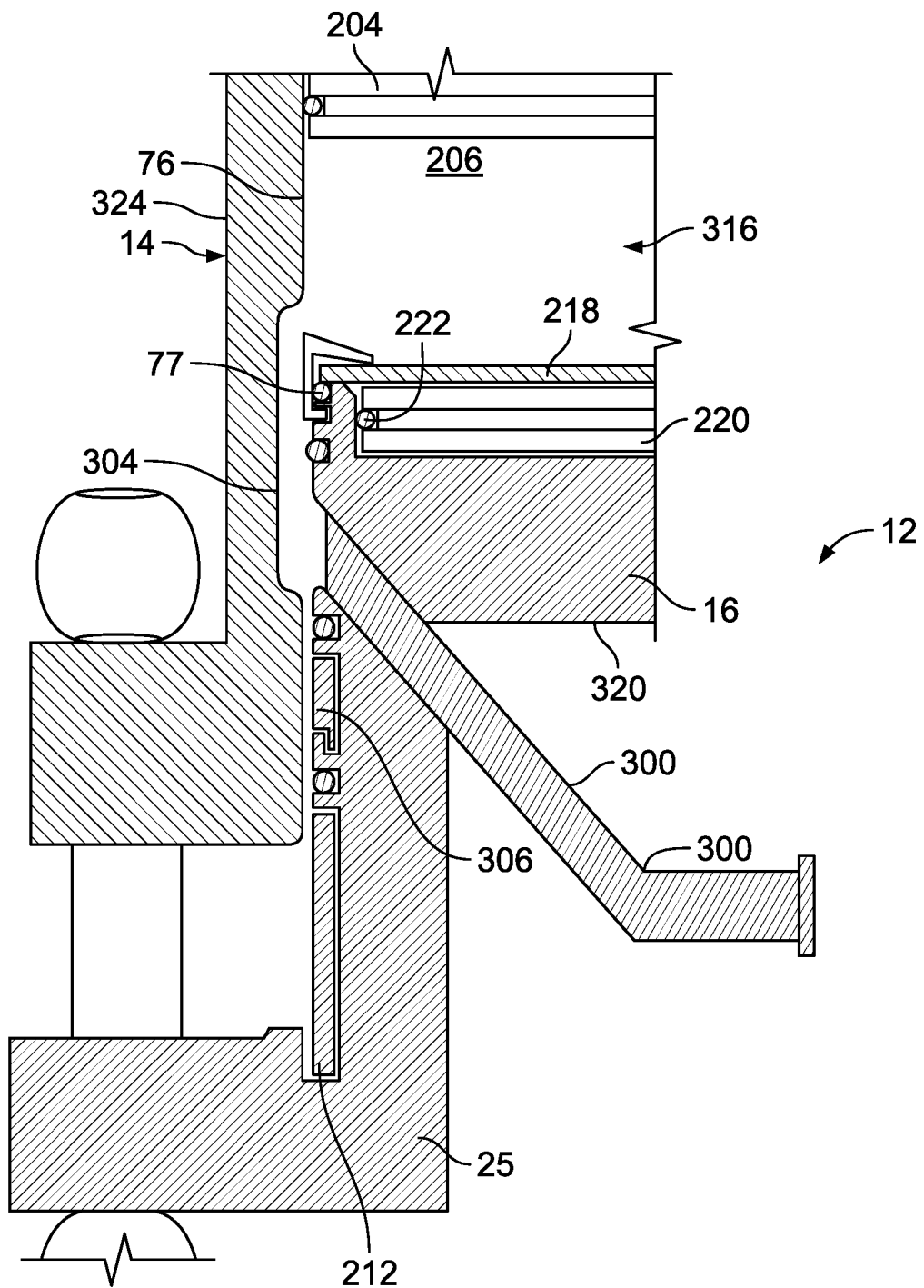
FIG. 21 is similar to FIG. 20, but shows the bottom plate in a second position relative to the main tube.

FIGS. 20-24 illustrate another embodiment of the column 12 in which the column 12 generally includes the main tube 14, the bottom plate 16, the piston 204, as discussed above, but is different in the manner discussed below. More particularly, the column 12 in this embodiment also includes a plurality of internal lower media ports 300 (instead of the external slurry ports 200, 2020) as well as an internal groove 304 and a glide ring 306 that is carried by the bottom plate 16 and slidably engages the main tube 14. As best illustrated in FIGS. 20 and 21, the plurality of internal lower media ports 300 are carried by the bottom plate 16 (whereas the slurry ports 200, 202 are formed in the main tube 14), while the internal groove 304 is formed in the interior surface 76 of the main tube 14. As will be discussed in greater detail below, the internal groove 304 selectively provides an internal flow path between each of the internal lower media ports 300, which in turn facilitates maintenance (e.g., cleaning) of the components of the column 12, but in a manner that does not affect the cylindricity of the internal wall of the column 12 (a problem with known slurry ports, as discussed above). Moreover, the main tube 14 includes an interior chamber 316 that is adapted to contain the bed 206 (or a different bed of media) that is selectively accessible via the internal groove 304, as will also be discussed in greater detail below.

Figure 22:
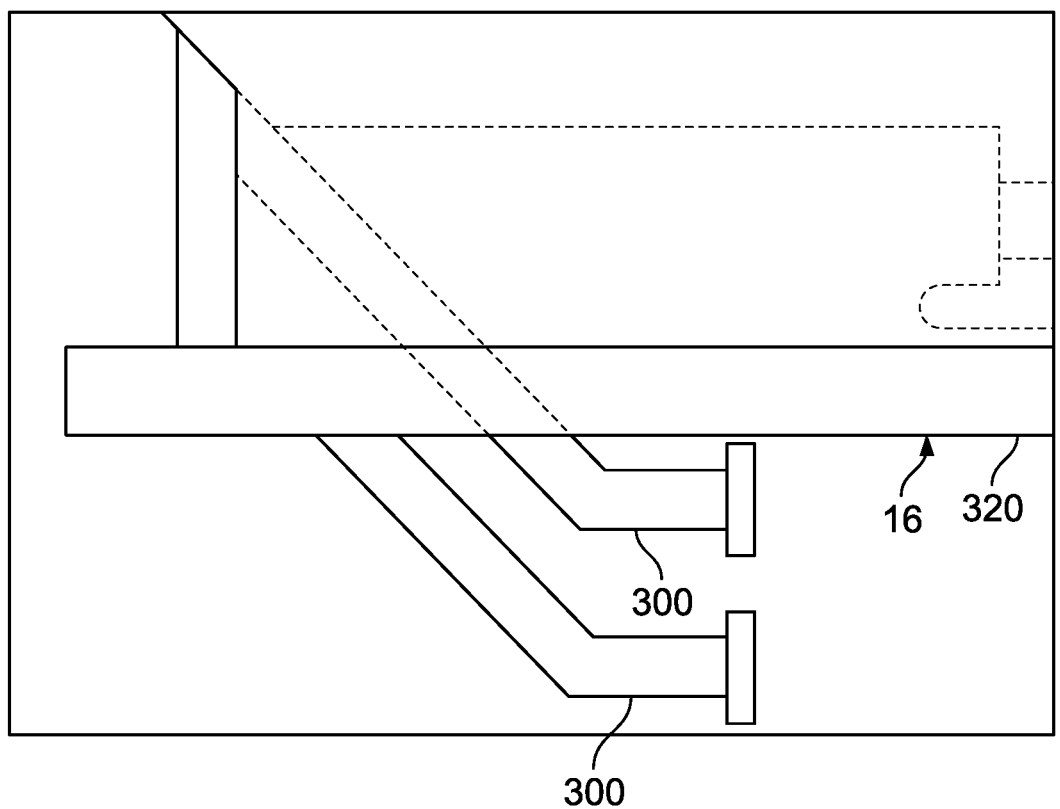
FIG. 22 is a side view of the bottom plate and the lower media ports of the chromatography and synthesis column of FIG. 20.
Figure 23:
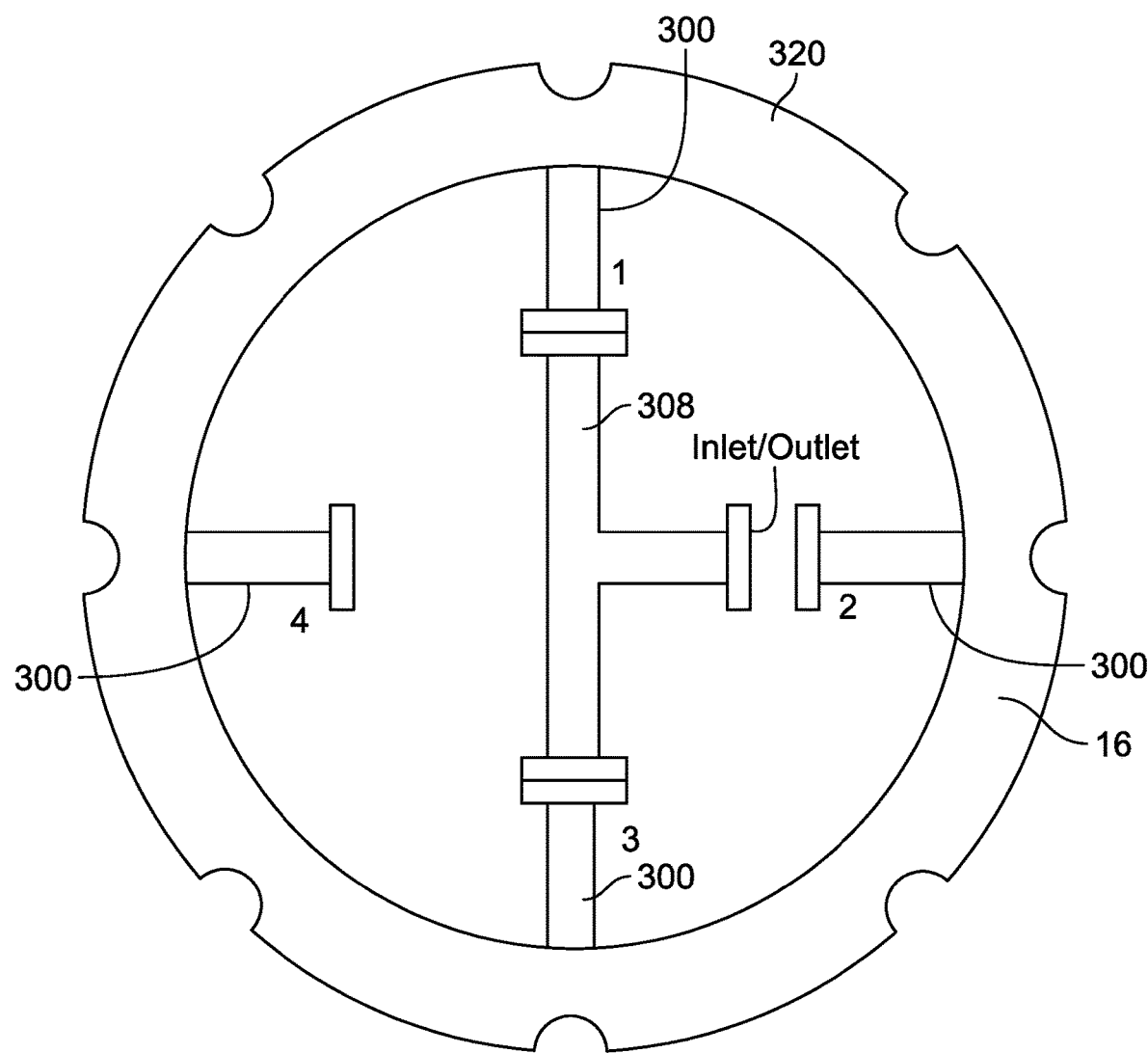
FIG. 23 is a bottom view of the bottom plate and the lower media ports of the chromatography and synthesis column of FIG. 20, with a first portion of the lower media ports hidden.
Figure 24:
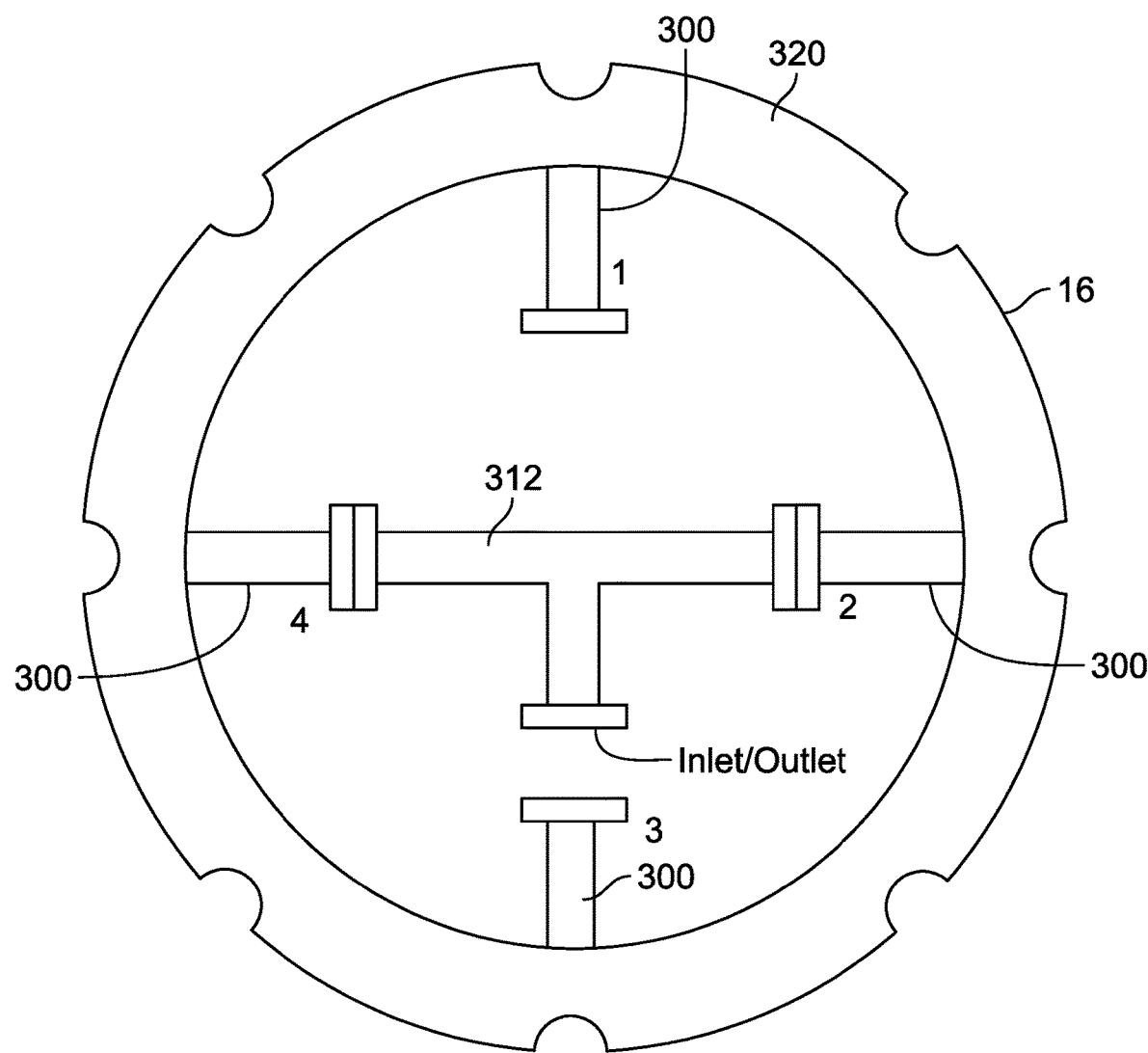
FIG. 24 is a bottom view of the bottom plate and the lower media ports of the chromatography and synthesis column of FIG. 20, with a second portion of the lower media ports hidden.

In this embodiment, the plurality of internal lower media ports 300 includes four uniform internal lower media ports (only one of which is visible in FIGS. 20 and 21, but all of which are depicted in FIGS. 22-24). Each of the four internal lower media ports is generally formed in and extends through the bottom plate 16, such that at least a bottom portion of each lower media port 300 is disposed underneath a bottom surface 320 of the bottom plate 16. While somewhat difficult to see, it will be appreciated that each of the four lower media ports is entirely disposed radially inwardly of an exterior surface 324 of the main tube 14 opposite the interior surface 76 (and at least partially, if not entirely, disposed radially inwardly of the interior surface 76 of the main tube 14). Moreover, each of the four lower media ports extends downwardly and radially inwardly away from the main tube 14. In this embodiment, each of the four internal lower media ports has a first portion that is oriented at an angle of 45 degrees relative to a bottom surface of the main tube 14 and to the bottom surface 320 of the bottom plate 16, and a second portion that is oriented at an angle of 45 degrees relative to the first portion, such that the second portion is parallel to the bottom surface of the main tube 14 and to the bottom surface 320 of the bottom plate 16. Additionally, as illustrated in FIG. 22, two of the four lower media ports 300 (in this case, lower media ports opposite one another) are disposed at a first height (i.e., a first distance from the bottom surface 320 of the bottom plate 16), and the other two lower media ports 300 (also opposite one another) are disposed at a second height (i.e., a second distance from the bottom surface 320 that is greater than the first distance). Further, as best illustrated in FIGS. 23 and 24, the four internal lower media ports 300 are circumferentially arranged about the bottom plate 16, such that the four internal lower media ports 300 are staggered or offset from one another. The four internal lower media ports 300 are evenly spaced apart from one another in this embodiment, though in other embodiments, the four internal lower media ports 300 can be different distances from one another. Finally, as best illustrated in FIGS. 23 and 24, two of the four lower media ports 300 (e.g., the lower media ports 300 disposed at the first height) are fluidly coupled to one another via a first manifold 308, and the remaining two of the four lower media ports 300 (e.g., the lower media ports 300 disposed at the second height) are fluidly coupled to one another via a second manifold 312.

In other embodiments, however, the plurality of internal lower media ports 300 can vary from what is illustrated in FIGS. 20-24. As an example, the plurality of internal lower media ports 300 can instead include two, three, five, six, or a different number of internal lower media ports. As another example, the plurality of internal lower media ports 300 need not be uniformly sized or otherwise constructed. As yet another example, the plurality of internal lower media ports 300 can extend and/or be located in a different manner. In other embodiments, the first and/or second portions of each of the internal lower media ports 300 can be oriented at an angle of 30 degrees, 60 degrees, 75 degrees, or some other angle relative to the bottom surface of the main tube 14 and to the bottom surface 320 of the bottom plate 16. Further, while not illustrated herein, it will be appreciated that the column 12 can also include one or more upper media ports formed in the main tube 14 (or another component of the column 12) and selectively exposed to the interior chamber 316. The one or more upper media ports can take the form of the upper slurry port 200, the lower media ports, or some other port.

In this embodiment, the internal groove 304 is formed in the interior surface 76 of the main tube 14 and extends in a radial direction around the entire circumference of the main tube 14. Moreover, the internal groove 304 has a length that extends in a direction that is parallel to a longitudinal axis 328 along which the piston 204 moves in the main tube 14. Thus, the internal groove 304 can also be referred to as an internal vertical groove or an internal radial groove. Further, in this embodiment, the internal groove 304 is sized so that the area of the internal groove 304 is substantially if not entirely equal to the area of the plurality of internal lower media ports 300, which in turn promotes a uniform and balanced fluid communication between the interior chamber 316 and the plurality of internal lower media ports 300 (when these components are in fluid communication with one another). In embodiments in which the column 12 also includes one or more upper media ports, the internal groove 304 will generally be disposed between the one or more upper media ports and the plurality of internal lower media ports 300. For example, when the column 12 includes the upper slurry port 200, the internal groove 304 will be disposed between the upper slurry port 200 and the plurality of internal lower media ports 300. In other embodiments, however, the internal groove 304 can be formed and/or be located in a different manner. As an example, the internal groove 304 can, in some embodiments, extend around only a portion of the circumference of the main tube 14.

As discussed above, the bottom plate 16 is movable relative to the main tube 14 via the use of the hydraulics 54 and removable couplings 81. More particularly, the bottom plate 16 is movable relative to the main tube 14 between a first position, an example of which is shown in FIG. 20, in which the bottom plate 16 is seated against a portion of the main tube 14 (e.g., the interior surface 76), and a second position, an example of which is shown in FIG. 21, in which the bottom plate 16 is spaced from that portion of the main tube 14 (e.g., the interior surface 76). It will also be appreciated that the bottom plate 16 is movable relative to the main tube 14 to a third position by decoupling the bottom plate 16 from the bottom of the main tube 14, which in turn allows the main tube 14 and the bottom plate 16 to be presented for maintenance.

As illustrated in FIG. 20, when the bottom plate 16 is in the first position, at least a top portion of the internal groove 304 engages a wall of the bottom plate 16, thereby sealing the interior chamber 316. In turn, the interior chamber 316 is not accessible (e.g., via the internal lower media ports 300 or the internal groove 304). Moreover, when the bottom plate 16 is in the first position, the internal groove 304 provides the internal flow path within the main tube 14 and between each of the internal lower media ports 300. The internal flow path beneficially allows the internal lower media ports 300 (and the internal groove 304) to be easily cleaned (and then drained) in a closed manner. For example, two of the internal lower media ports 300 can be used as inlets that receive one or more cleaning solutions and distribute the one or more cleaning solutions into the internal flow path, with the remaining two internal media ports 300 used as outlets that receive the one or more cleaning solutions after they have passed through some or all of the internal flow path before draining or exhausting those cleaning solutions out of the internal flow path. At the same time, because the interior chamber 316 is sealed, the chromatography process can be performed, without interruption, using the column 12.

Meanwhile, as illustrated in FIG. 21, when the bottom plate 16 is in the second position, at least the top portion of the internal groove 304 is spaced from the wall of the bottom plate 16, which thereby unseals the interior chamber 316, exposes the interior groove 304, and places the interior chamber 316 in fluid communication with the internal groove 304 (and, in turn, with the plurality of internal lower media ports 300). Beneficially, because in this embodiment the internal lower media ports 300 are equally spaced apart from one another, the internal lower media ports 300 are placed in fluid communication with the interior chamber 316 in a substantially uniform and balanced manner. In any event, this fluid communication allows the bed 206 to be evacuated via the internal groove 304 and the plurality of internal lower media ports 300 and/or media to be recirculated. To this end, the bed 206 can be floated upward, away from the bottom plate 16, which causes a substantially uniform collapse of the bed 206 out of the interior chamber 316 and into the internal groove 304. Importantly, the radial nature of the internal groove 304 causes the bed 206 to collapse into the internal groove 304 (and not into the center of the main tube 14) without eddies. In other words, the bed 206 can be uniformly (or substantially uniformly) be unpacked. In turn, the bed 206 can in turn be evacuated out of the internal groove 304 and out of the main tube 14 via the plurality of internal lower media ports 300. It will be appreciated that the same process can be employed to re-introduce and re-form the bed 206 in the interior chamber 316.

Further, in embodiments in which the column 12 also includes one or more upper media ports, this will also place the one or more upper media ports in fluid communication with the internal groove 304 (and, in turn, with the plurality of internal lower media ports 300 as well). When this happens, one or more cleaning solutions can be recirculated throughout the column 12, namely through the one or more upper media ports, the interior chamber 316, the internal groove 304, and the plurality of internal lower media ports 300. Finally, it will be appreciated that the internal groove 304 and the plurality of lower media ports 300 can be used in connection with other chromatography columns 12, including any of the chromatography columns 12 described herein and other chromatography columns not discussed herein.

Those skilled in the art will recognize that a wide variety of modifications, alterations, and combinations can be made with respect to the above described embodiments without departing from the scope of the disclosure, and that such modifications, alterations, and combinations are to be viewed as being within the ambit of the inventive concept. Further, one or more of the above components, assemblies, and embodiments can be utilized to retrofit current columns to provide the features and advantages described herein.

The invention claimed is:
1. A chromatography column, comprising:
   a main tube;
   a bottom plate coupled to the main tube;
   a plurality of lower media ports carried by the bottom plate; and
   an internal groove formed in an interior surface of the main tube, wherein the internal groove interacts with the bottom plate and selectively provides an internal flow path between each of the lower media ports.

2. The chromatography column of claim 1, wherein the bottom plate is movable relative to the main tube between a first position, in which the bottom plate is seated against a portion of the main tube, and a second position, in which the bottom plate is spaced from the portion of the main tube.

3. The chromatography column of claim 2, wherein when the bottom plate is in the first position, the plurality of lower media ports is exposed to the internal groove to provide a cleaning path for the plurality of lower media ports.

4. The chromatography column of claim 1, wherein each of the plurality of lower media ports extends to a positon underneath a bottom surface of the bottom plate.

5. The chromatography column of claim 1, wherein each of the plurality of lower media ports is entirely disposed radially inwardly of an exterior surface of the main tube.

6. The chromatography column of claim 1, wherein the plurality of lower media ports is circumferentially arranged about the bottom plate.

7. The chromatography column of claim 1, wherein the main tube comprises an interior chamber that is adapted to contain a bed of media, and wherein the interior chamber is selectively accessible via the internal groove.

8. The chromatography column of claim 1, further comprising one or more upper media ports formed in an upper portion of the main tube, wherein the internal groove is disposed between the one or more upper media ports and the plurality of lower media ports.

9. The chromatography column of claim 1, further comprising a piston assembly movably disposed in the main tube along a longitudinal axis, wherein the internal groove extends in a direction parallel to the longitudinal axis.

10. The chromatography column of claim 1, further comprising:
a top plate coupled to a first end of the main tube, wherein the bottom plate is coupled to a second end of the main tube opposite the first end, and wherein the piston assembly comprises a piston rod extending through an opening in the top plate.

11. A chromatography column, comprising:
a main tube comprising an interior chamber that is adapted to contain a bed of media;
a bottom plate coupled to the main tube;
a plurality of lower media ports carried by the bottom plate; and
an internal groove formed in an interior surface of the main tube,
wherein the interior chamber is selectively accessible via the internal groove, and
wherein the internal groove provides an internal flow path between each of the lower media ports.

12. The chromatography column of claim 11, wherein the bottom plate is movable relative to the main tube between a first position, in which the bottom plate is seated against a portion of the main tube, and a second position, in which the bottom plate is spaced from the portion of the main tube.

13. The chromatography column of claim 12, further comprising a piston assembly movably disposed in the main tube, wherein the interior chamber is between the piston assembly and the bottom plate, wherein when the bottom plate is in the first position, the interior chamber is sealed and the plurality of lower media ports is exposed to the internal groove to provide a cleaning path for the plurality of lower media ports, and wherein when the bottom plate is in the second position, the interior chamber is exposed to the plurality of lower media ports via the internal groove.

14. The chromatography column of claim 11, wherein the plurality of lower media ports is circumferentially arranged about the bottom plate.

15. The chromatography column of claim 11, wherein each of the plurality of lower media ports is entirely disposed radially inwardly of an exterior surface of the main tube.

16. The chromatography column of claim 11, wherein each of the plurality of lower media ports extends to a positon underneath a bottom surface of the bottom plate.

17. The chromatography column of claim 11, further comprising a piston movably disposed in the main tube along a longitudinal axis, wherein the internal groove extends in a direction parallel to the longitudinal axis.

18. The chromatography column of claim 11, further comprising one or more upper media ports formed in an upper portion of the main tube, wherein the internal groove is disposed between the one or more upper media ports and the plurality of lower media ports.

19. The chromatography column of claim 18, wherein the bottom plate is movable relative to the main tube between a first position, in which the bottom plate is seated against a portion of the main tube, and a second position, in which the bottom plate is spaced from the portion of the main tube, and wherein when the bottom plate is in the second position, the interior chamber is exposed to the one or more upper media ports.

20. A method of servicing a chromatography column having a main tube, a bottom plate coupled to the main tube, a bed of media disposed in an interior chamber of the main tube, a plurality of lower media ports carried by the bottom plate, and an internal groove formed in an interior surface of the main tube, the method comprising:
performing a chromatography process using the chromatography column when the bottom plate is in a first position relative to the main tube, wherein in the first position the bottom plate is seated against a portion of the main tube and the interior chamber is sealed;
when the bottom plate is in the first position, cleaning the plurality of lower media ports by circulating a cleaning solution through an internal flow path provided by the internal groove between each of the lower media ports;
moving the bottom plate, relative to the main tube, from the first position to a second position in which the bottom plate is spaced from the portion of the main tube, thereby unsealing the interior chamber; and
when the bottom plate is in the second position, evacuating the bed of media via the internal groove and the plurality of lower media ports.

21. The method of claim 20, wherein evacuating comprises:
floating the bed of media upward, away from the bottom plate, thereby causing a substantially uniform collapse of the bed of media out of the interior chamber and into the internal groove.

22. The method of claim 21, wherein the bed of media collapses into the internal groove without eddies.

* * * * *